United States Patent
Hiroi

(10) Patent No.: US 10,725,561 B2
(45) Date of Patent: Jul. 28, 2020

(54) DISPLAY SYSTEM THAT SWITCHES OPERATION ACCORDING TO MOVEMENT DETECTED

(71) Applicant: SEIKO EPSON CORPORATION, Tokyo (JP)

(72) Inventor: Yoshiaki Hiroi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 84 days.

(21) Appl. No.: 15/876,521

(22) Filed: Jan. 22, 2018

(65) Prior Publication Data
US 2018/0217681 A1    Aug. 2, 2018

(30) Foreign Application Priority Data
Jan. 30, 2017    (JP) ................................. 2017-014483

(51) Int. Cl.
*G06F 3/0346* (2013.01)
*G02B 27/00* (2006.01)
(Continued)

(52) U.S. Cl.
CPC ............ *G06F 3/0346* (2013.01); *G02B 6/00* (2013.01); *G02B 6/003* (2013.01); *G02B 6/0031* (2013.01); *G02B 6/0055* (2013.01); *G02B 6/0088* (2013.01); *G02B 27/0093* (2013.01); *G02B 27/0172* (2013.01); *G06F 3/011* (2013.01); *G06F 3/017* (2013.01); *G06F 3/018* (2013.01); *G06F 3/0236* (2013.01);
(Continued)

(58) Field of Classification Search
CPC .... G02B 6/003; G02B 6/0031; G02B 6/0055; G02B 6/0088; G02B 27/0093; G02B 27/0172; G02B 27/30; G02B 2027/0123; G02B 2027/0138; G02B 2027/014; G02B 2027/0178; G02B 2027/0187; G06F 3/0346; G06F 3/011; G06F 3/017; G06F 3/018; G06F 3/0236; G06F 3/0482; G06F 3/04892; G06F 3/0485
See application file for complete search history.

(56) References Cited

U.S. PATENT DOCUMENTS

| | | | | |
|---|---|---|---|---|
| 2010/0124949 A1* | 5/2010 | Dennuynck | ........... | G06F 1/1626 455/569.1 |
| 2013/0033448 A1* | 2/2013 | Yano | ................... | G06F 3/04883 345/173 |

(Continued)

FOREIGN PATENT DOCUMENTS

| | | |
|---|---|---|
| JP | 2015-008443 A | 1/2015 |
| JP | 2015-090530 A | 5/2015 |

(Continued)

*Primary Examiner* — Stephen G Sherman
(74) *Attorney, Agent, or Firm* — Oliff PLC

(57) ABSTRACT

A display system includes a head-mounted display device and an input device for operating the head-mounted display device. In this display system, the input device is mounted on an arm or a leg of a user and has a movement detection unit which detects a movement in a circumferential direction of the arm or the leg where the input device is mounted. The head-mounted display device displays an operation screen where an operation is accepted, and switches the operation on the operation screen according to the movement detected by the movement detection unit.

7 Claims, 22 Drawing Sheets

(51) Int. Cl.
*G06F 3/01* (2006.01)
*G06F 3/023* (2006.01)
*G02B 27/01* (2006.01)
*F21V 8/00* (2006.01)
*G06F 3/0482* (2013.01)
*G06F 3/0489* (2013.01)
*G02B 6/00* (2006.01)
*G02B 27/30* (2006.01)
*G06F 3/0485* (2013.01)

(52) U.S. Cl.
CPC ........ *G06F 3/0482* (2013.01); *G06F 3/04892* (2013.01); *G02B 27/30* (2013.01); *G02B 2027/014* (2013.01); *G02B 2027/0123* (2013.01); *G02B 2027/0138* (2013.01); *G02B 2027/0178* (2013.01); *G02B 2027/0187* (2013.01); *G06F 3/0485* (2013.01)

(56) References Cited

U.S. PATENT DOCUMENTS

| | | | |
|---|---|---|---|
| 2013/0265229 A1* | 10/2013 | Forutanpour | G06F 3/014 345/158 |
| 2014/0198035 A1* | 7/2014 | Bailey | G06F 3/014 345/156 |
| 2015/0123895 A1 | 5/2015 | Takano | |
| 2015/0199167 A1 | 7/2015 | Sugiyama | |
| 2015/0281569 A1 | 10/2015 | Mizuno et al. | |
| 2016/0139667 A1 | 5/2016 | Nagasaki et al. | |
| 2016/0196693 A1* | 7/2016 | Kobayashi | G06T 19/006 345/633 |

FOREIGN PATENT DOCUMENTS

| | | |
|---|---|---|
| JP | 2015-135563 A | 7/2015 |
| JP | 2015-201160 A | 11/2015 |
| JP | 2016-115125 A | 6/2016 |

* cited by examiner

|  | A-COLUMN | KA-COLUMN | SA-COLUMN | TA-COLUMN | NA-COLUMN |
|---|---|---|---|---|---|
| A-ROW | A | KA | SA | TA | NA |
| I-ROW | I | KI | SHI | CHI | NI |
| U-ROW | U | KU | SU | TSU | NU |
| E-ROW | E | KE | SE | TE | NE |
| O-ROW | O | KO | SO | TO | NO |

FIG.14

|     |   |   |   |   |   |   |   |   |   |
|-----|---|---|---|---|---|---|---|---|---|
| A | B | C | D | E | F | G | H | I | J |
| K | L | M | N | O | P | Q | R | S | T |
| U | V | W | X | Y | Z | ( | ) | 【 | 】 |
| - | _ | / | ; | & | @ | # | * | ^ | ' |

FIG.23

DISPLAY SYSTEM THAT SWITCHES OPERATION ACCORDING TO MOVEMENT DETECTED

BACKGROUND

1. Technical Field

The present invention relates to a display system.

2. Related Art

Recently, a head-mounted display device which can display an image in front of the eyes of the user is becoming widely used. JP-A-2015-90530 discloses a technique in which a movement of a finger of the user is detected and then the detected movement of the finger is used as an input to a head-mounted display device.

In the display system disclosed in JP-A-2015-90530, an advanced detection function using image recognition is needed in order to detect the movement of the finger, and therefore heavy-load processing is imposed on the head-mounted display device. Thus, in a display system having a head-mounted display device, a technique that enables input processing to be carried out simply by imposing light-load processing on the head-mounted display device is desired.

SUMMARY

An advantage of some aspects of the invention is to solve at least a part of the problems described above, and the invention can be implemented as the following configurations.

(1) According to an aspect of the invention, a display system including a head-mounted display device and an input device for operating the head-mounted display device is provided. In this display system, the input device is mounted on an arm or a leg of a user and has a movement detection unit which detects a movement in a circumferential direction of the arm or the leg where the input device is mounted. The head-mounted display device displays an operation screen where an operation is accepted, and switches the operation on the operation screen according to the movement detected by the movement detection unit. With the display system of this configuration, a movement in the circumferential direction of the armor the leg of the user can be detected and the operation on the operation screen can be switched according to the movement. The movement in the circumferential direction of the arm or the leg is a simple movement in a single direction and is a relatively large movement. Therefore, an advanced detection function is not needed for this. Also, the movement detection unit is provided on the side of the input device. Thus, with the display system of this configuration, the processing load on the head-mounted display device can be reduced when an operation on the operation screen is carried out.

(2) In the display system, the head-mounted display device may have a display unit movement detection unit which detects a movement of an image display unit provided in the head-mounted display device. The switching of the operation on the operation screen may include finding a relative movement in the circumferential direction of the arm or the leg with respect to a direction of the image display unit, based on the movement detected by the movement detection unit and the movement of the image display unit detected by the display unit movement detection unit, and switching the operation on the operation screen according to the relative movement thus found. With the display system of this configuration, a movement in the circumferential direction of the arm or the leg where the input device is mounted can be found with high accuracy as a movement with respect to the image display unit.

(3) The input device may be a wristband-type wearable device. With the display system of this configuration, convenience for the user can be increased further.

(4) In the display system, the movement detection unit may have an acceleration sensor with two or more axes, and a processing device which detects the movement from a detection signal of the acceleration sensor. With the display system of this configuration, the input device can be miniaturized.

(5) In the display system, the operation screen may be an input board where five characters of the Japanese kana characters are arrayed in one of longitudinal and lateral directions, based on vowels, and ten characters are arrayed in the other of the longitudinal and lateral directions, based on consonants. The switching of the operation according to the movement may be switching a character selected from among the characters arrayed in the one of the longitudinal and lateral directions on the input board. With the display system of this configuration, the Japanese kana characters (hiragana or katakana) can be inputted, reducing the processing load on the head-mounted display device.

(6) In the display system, the input device may have a second movement detection unit which detects a movement in a bending direction of a distal end-side part from a joint of the arm or the leg where the input device is mounted. The head-mounted display device may switch a character selected from among the characters arrayed in the other of the longitudinal and lateral directions on the input board according to the movement detected by the second movement detection unit. With the display system of this configuration, the user can input the Japanese kana characters simply by moving the armor the leg where the input device is mounted. Therefore, excellent operability is achieved.

(7) In the display system, the input device may be a wristband-type wearable device. The operation screen may be an input board where five characters of the Japanese kana characters are arrayed in one of longitudinal and lateral directions, based on vowels, and where ten characters are arrayed in the other of the longitudinal and lateral directions, based on consonants. The switching of the operation according to the movement may be switching vowels on the input board. The movement detection unit may be configured to detect a movement of holding out the forearm in front of the chest and then rotating the wrist. With the display system of this configuration, the user can carry out an input operation in such a way that the direction of rotation of the wrist and the direction of the operation on the input board coincide with each other. Therefore, the user can intuitively carry out the operation and excellent operability is achieved.

The invention can also be realized in various forms other than the display system. For example, the invention can be realized in the form of a control method for a display system, a computer program for realizing the functions of components provided in a display system, a recording medium with the computer program recorded therein, and the like.

BRIEF DESCRIPTION OF THE DRAWINGS

The invention will be described with reference to the accompanying drawings, wherein like numbers reference like elements.

FIG. 14 is an explanatory view showing the state where a selected key is changed on the hiragana input board.

FIG. 23 is an explanatory view showing an alphabetic input board as a modification.

DESCRIPTION OF EXEMPLARY EMBODIMENTS

A. First Embodiment

A-1. Overall Configuration of Display System

Figure 1:
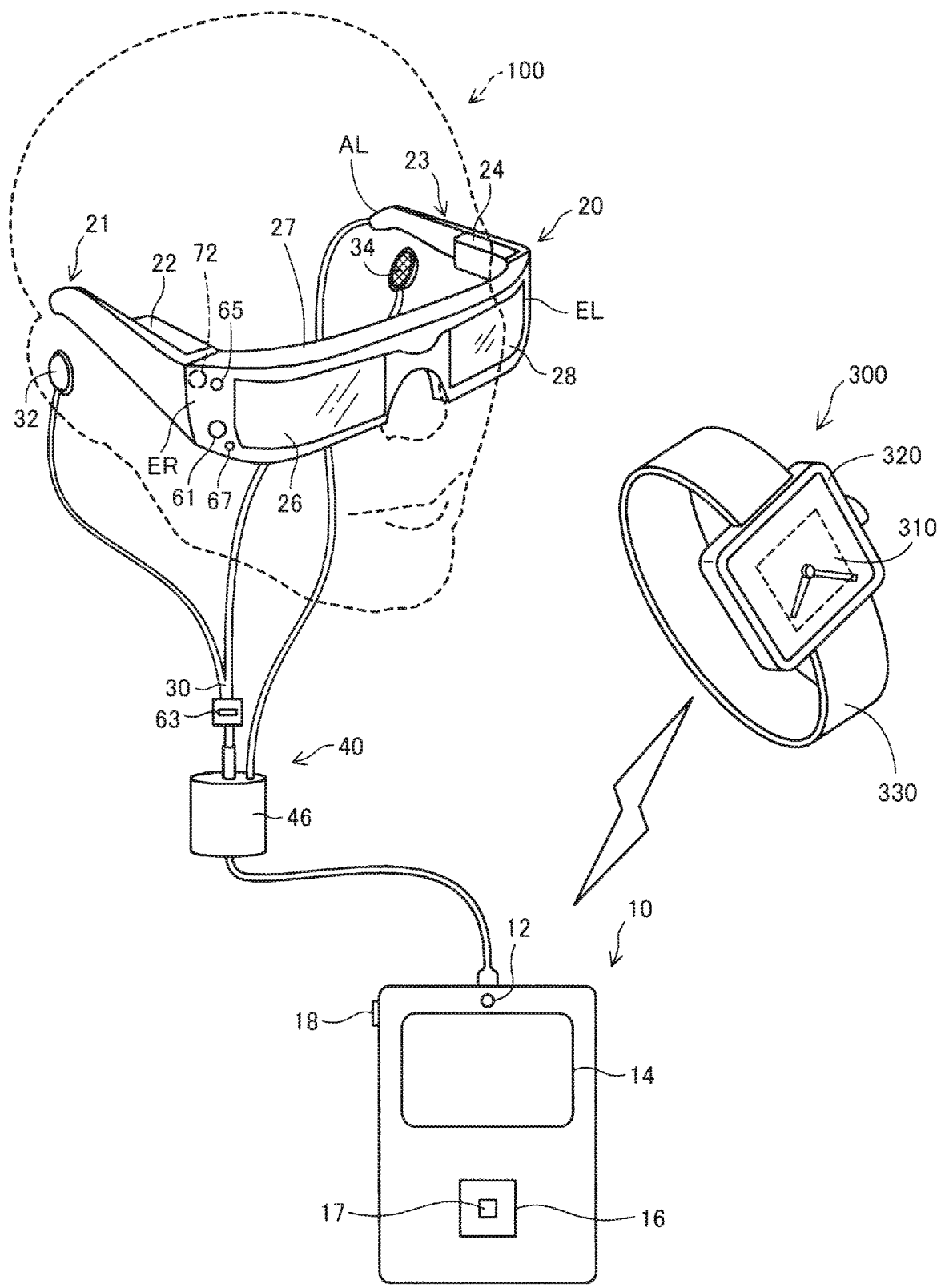
FIG. 1 is an explanatory view showing the schematic configuration of a display system according to a first embodiment of the invention.

FIG. 1 is an explanatory view showing the schematic configuration of a display system according to a first embodiment of the invention. The display system includes a head-mounted display device 100 and a wristwatch-type wearable device 300. The wristwatch-type wearable device 300 is a watch-type terminal (device) which a user of the head-mounted display device 100 can wear on the wrist for use. The head-mounted display device 100 and the wristwatch-type wearable device 300 are wireless connected to each other and can communicate with each other. In addition to the time measuring function, the wristwatch-type wearable device 300 functions as an input device for operating the head-mounted display device 100.

A-2. Configuration of Head-Mounted Display Device

The head-mounted display device 100 is a display device mounted on the head of the user and is also called HMD (head-mounted display). The HMD 100 is a see-through (transmission-type) head-mounted display device which allows an image to emerge in an external field that is transmitted through glasses and thus visually recognized.

The HMD 100 has an image display unit 20 which allows the user to visually recognize an image, and a control device (controller) 10 which controls the image display unit 20.

The image display unit 20 is a wearing body to be mounted on the head of the user and is in the form of eyeglasses in this embodiment. The image display unit 20 has a right display unit 22, a left display unit 24, a right light guide plate 26, and a left light guide plate 28, on a support body including a right holding part 21, a left holding part 23, and a front frame 27.

The right holding part 21 and the left holding part 23 each extend backward from both ends of the front frame 27 and hold the image display unit 20 on the head of the user, like the temples of eyeglasses. Of the two ends of the front frame 27, the end part situated on the right-hand side of the user when the user is wearing the image display unit 20 is referred to as an end part ER, and the end part situated on the left-hand side of the user is referred to as an end part EL. The right holding part 21 is provided, extending from the end part ER of the front frame 27 to a position corresponding to the right temporal region of the user when the user is wearing the image display unit 20. The left holding part 23 is provided, extending from the end part EL of the front frame 27 to the left temporal region of the user when the user is wearing the image display unit 20.

The right light guide plate 26 and the left light guide plate 28 are provided on the front frame 27. The right light guide plate 26 is situated in front of the right eye of the user when the user is wearing the image display unit 20, and allows the right eye to visually recognize an image. The left light guide plate 28 is situated in front of the left eye of the user when the user is wearing the image display unit 20, and allows the left eye to visually recognize an image.

The front frame 27 has a shape that connects one end of the right light guide plate 26 and one end of the left light guide plate 28 to each other. The position of this connection corresponds to the position of the glabella of the user when the user is wearing the image display unit 20. On the front frame 27, a nose pad part to be butted against the nose of the user when the user is wearing the image display unit 20 may be provided at the connecting position between the right light guide plate 26 and the left light guide plate 28. In this case, the image display unit 20 can be held on the head of the user with the nose pad part, the right holding part 21, and the left holding part 23. Also, a belt that comes in contact with the back of the user's head when the user is wearing the image display nit 20 may be connected to the right holding part 21 and the left holding part 23. In this case, the image display unit 20 can be firmly held on the head of the user with the belt.

The right display unit 22 displays an image through the right light guide plate 26. The right display unit 22 is provided on the right holding part 21 and is situated near the right temporal region of the user when the user is wearing the image display unit 20. The left display unit 24 displays an image through the left light guide plate 28. The left display unit 24 is provided on the left holding part 23 and is situated near the left temporal region of the user when the user is wearing the image display unit 20. The right display unit 22 and the left display unit 24 are also collectively referred to as a "display drive unit".

The right light guide plate 26 and the left light guide plate 28 in this embodiment are optical units (for example, prisms) formed of a light-transmitting resin or the like, and guide image light outputted from the right display unit 22 and the left display unit 24 to the eyes of the user. A light adjusting plate may be provided on the surfaces of the right light guide plate 26 and the left light guide plate 28. The light adjusting plate is a thin plate-like optical element with its transmittance varying depending on the wavelength range of light, and functions as a so-called wavelength filter. The light adjusting plate is arranged, for example, in such a way as to cover the surface of the front frame 27 (the surface opposite to the side facing the eyes of the user). By properly selecting optical characteristics of the light adjusting plate, it is possible to adjust the transmittance of light in an arbitrary wavelength range such as visible ray, infrared ray, or ultraviolet ray, and to adjust the amount of external light that becomes incident on the right light guide plate 26 and the left light guide plate 28 from outside and is transmitted through the right light guide plate 26 and the left light guide plate 28.

The image display unit 20 guides the image light generated by each of the right display unit 22 and the left display unit 24 to the right light guide plate 26 and the left light guide plate 28 and allows the user to visually recognize an image based on this image light (augmented reality (AR) image) (this is also referred to as "displaying an image"). When external light is transmitted through the right light guide plate 26 and the left light guide plate 28 from the front of the user and becomes incident on the eyes of the user, the image light forming the image and the external light become incident on the eyes of the user. Therefore, the visibility of the image to the user is influenced by the intensity of the external light.

Thus, for example, by installing a light adjusting plate on the front frame 27 and properly selecting or adjusting optical characteristics of the light adjusting plate, it is possible to adjust the visibility of the image. As a typical example, a light adjusting plate having such a light transmittance that the user wearing the HMD 100 can visually recognize at least the external scenery can be selected. Using the light adjusting plate can be expected to have effects such as protecting the right light guide plate 26 and the left light guide plate 28 and restraining damage or attachment of stains to the right light guide plate 26 and the left light guide plate 28. The light adjusting plate may be attachable to/removable from the front frame 27 or each of the right light guide plate 26 and the left light guide plate 28. Also, a plurality of types of light adjusting plates may be exchanged to be attachable/removable. Alternatively, the light adjusting plate may be omitted.

A camera 61 is arranged on the front frame 27 of the image display unit 20. The camera 61 is provided at a position that does not block the external light transmitted through the right light guide plate 26 and the left light guide plate 28, on the front surface of the front frame 27. In the example of FIG. 1, the camera 61 is arranged on the side of the end part ER of the front frame 27. The camera 61 may be arranged on the side of the end part EL of the front frame 27, or may be arranged at the connecting part between the right light guide plate 26 and the left light guide plate 28.

The camera 61 is a digital camera having an image pickup element such as CCD or CMOS, and an image pickup lens or the like. While the camera 61 in this embodiment is a monocular camera, a stereo camera may be employed. The camera 61 picks up an image of at least a part of the external scenery (real space) in the direction of the front of the HMD 100, that is, in the field of vision direction visually recognized by the user when the user is wearing the image display unit 20. In other words, the camera 61 picks up an image in a range or direction overlapping with the field of vision of the user, and picks up an image in the direction in which the user looks. The width of the angle of view of the camera 61 can be suitably set. In this embodiment, the width of the angle of view of the camera 61 is set in such a way as to pick up an image of the entirety of the field of vision of the user that the user can visually recognize through the right light guide plate 26 and the left light guide plate 28. The camera 61 executes image pickup under the control of a control function unit 150 (FIG. 6) and outputs the resulting picked-up image data to the control function unit 150.

The HMD 100 may have a distance sensor which detects the distance to a measurement target object located in a preset direction of measurement. The distance sensor can be arranged, for example, at the connecting part between the right light guide plate 26 and the left light guide plate 28 of the front frame 27. The direction of measurement by the distance sensor can be the direction of the front side of the HMD 100 (direction overlapping with the direction of image picked up by the camera 61). The distance sensor can be formed, for example, by a light emitting unit such as an LED or laser diode, and a light receiving unit which receives reflected light of the light emitted from the light source, reflected by the measurement target object. In this case, the distance is found by triangulation or by distance measuring processing based on time lag. The distance sensor may also be configured of, for example, a transmitting unit which emits ultrasonic waves, and a receiving unit which receives ultrasonic waves reflected by the measurement target object. In this case, the distance is found by distance measuring processing based on time lag. The distance sensor is controlled by the control function unit 150 (FIG. 6) and outputs the result of detection to the control function unit 150, similarly to the camera 61.

Figure 2:
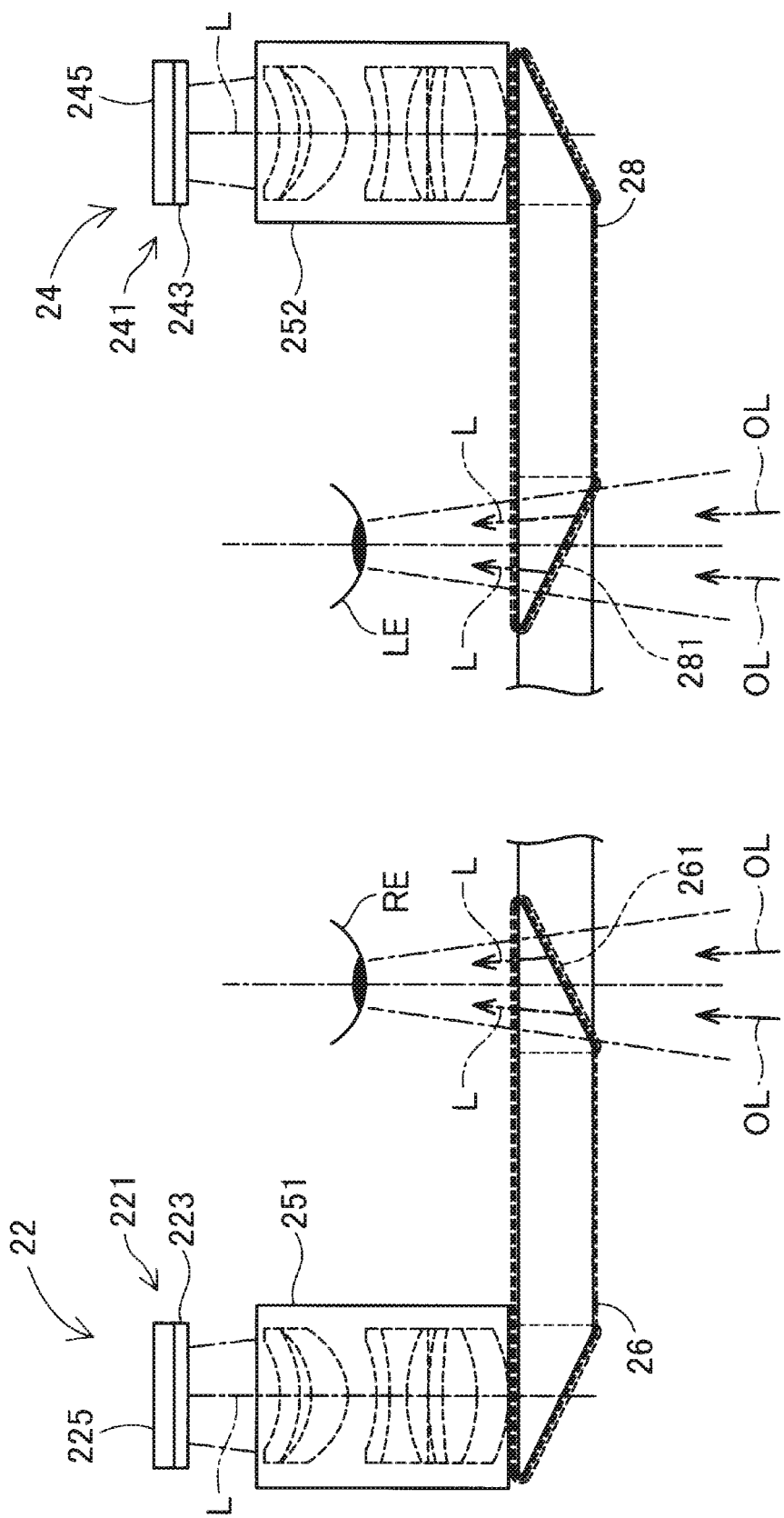
FIG. 2 is a plan view of essential parts showing the configuration of an optical system provided in an image display unit.

FIG. 2 is a plan view of essential parts showing the configuration of the optical system provided in the image display unit 20. For the sake of convenience of the description, FIG. 2 illustrates the right eye RE and the left eye LE of the user. As shown in FIG. 2, the right display unit 22 and the left display unit 24 are configured to be bilaterally symmetrical to each other.

As a configuration to allow the right eye RE to visually recognize an image (AR image), the right display unit 22 has an OLED (organic light emitting diode) unit 221 and a right optical system 251. The OLED unit 221 emits image light. The right optical system 251 has a lens group or the like and guides the image light L emitted from the OLED unit 221, to the right light guide plate 26.

The OLED unit 221 has an OLED panel 223 and an OLED drive circuit 225 which drives the OLED panel 223. The OLED panel 223 is a self-emitting display panel configured of light emitting elements which emit light by organic electroluminescence and emit color light of R (red), G (green), and B (blue), respectively. In the OLED panel 223, a plurality of pixels, each pixel including one R, G and B element each, is arranged in the form of a matrix.

The OLED drive circuit 225 executes selection from and energization of the light emitting elements provided in the OLED panel 223 and causes the light emitting elements to emit light, under the control of the control function unit 150

Figure 5:
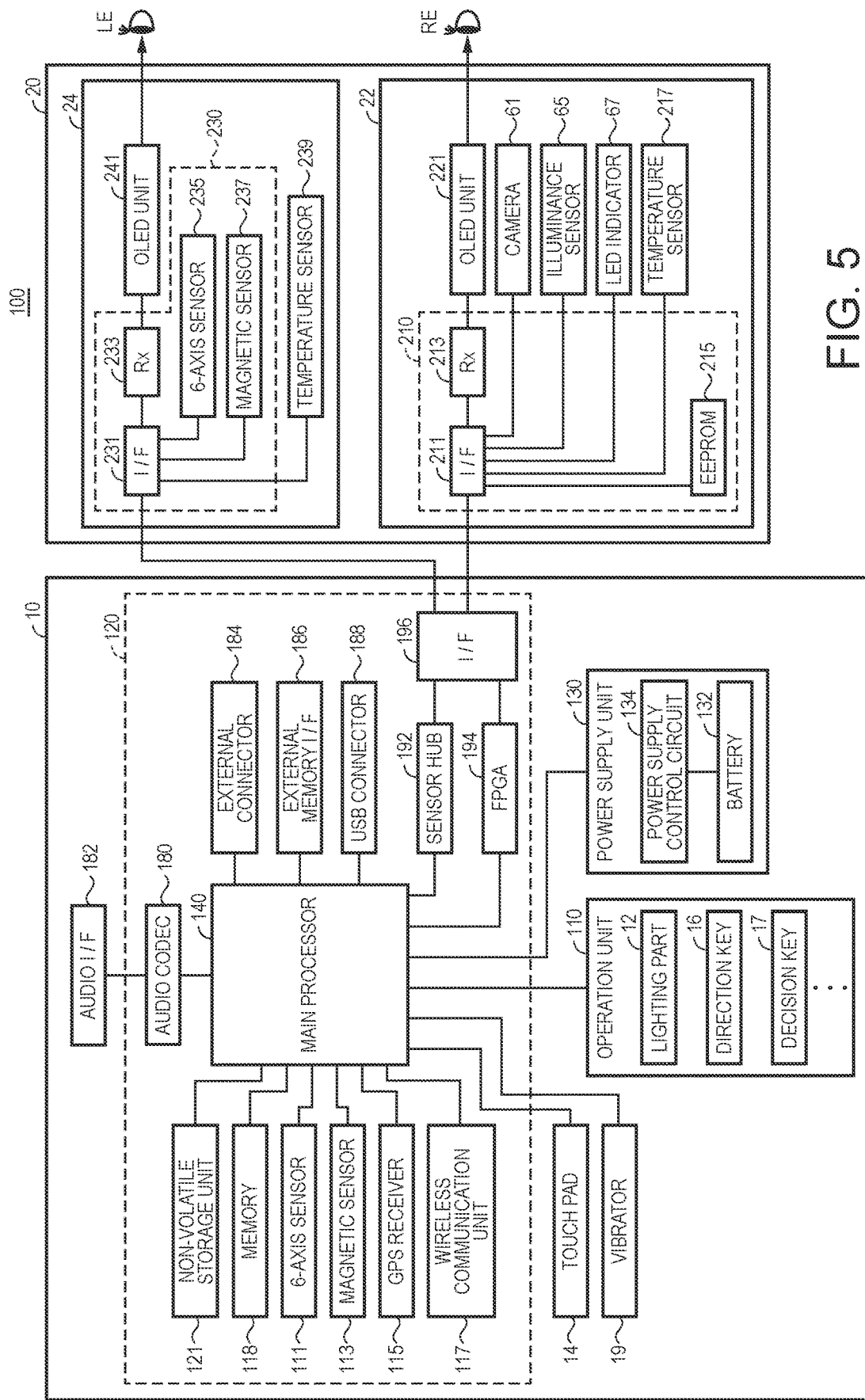
FIG. 5 is a block diagram showing the electrical configuration of an HMD.
Figure 6:
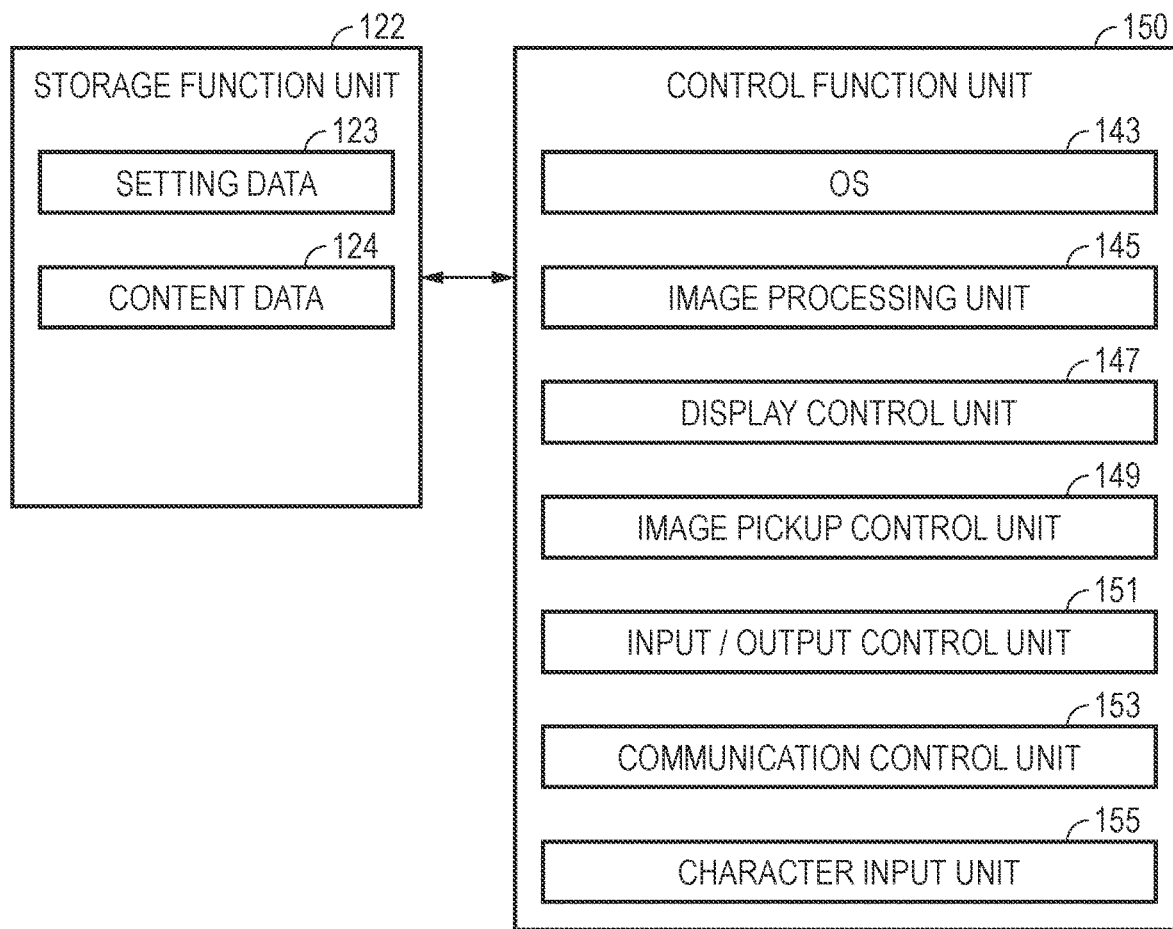
FIG. 6 is a block diagram functionally showing the configuration of a control device.

(FIG. 6). The OLED drive circuit 225 is fixed to the back side of the OLED panel 223, that is, the back side of the light emitting surface, by bonding or the like. The OLED drive circuit 225 may be configured of, for example, a semiconductor device which drives the OLED panel 223, and may be mounted on a substrate fixed to the back side of the OLED panel 223. On this substrate, a temperature sensor 217 (FIG. 5), described later, is mounted. The OLED panel 223 may employ a configuration in which light emitting elements that emit white light are arranged in the form of a matrix, with color filters corresponding to the color light of R, G and B superimposed thereon. Moreover, the OLED panel 223 with a WRGB configuration having a light emitting element which radiates W (white) light in addition to light emitting elements which radiate the color light of R, G and B may be employed.

The right optical system 251 has a collimating lens which turns the image light L emitted from the OLED panel 223 into a parallel luminous flux. The image light L, turned into the parallel luminous flux by the collimating lens, becomes incident on the right light guide plate 26. In the optical path through which the light is guided inside the right light guide plate 26, a plurality of reflection surfaces that reflects the image light L is formed. The image light L is reflected a plurality of times inside the right light guide plate 26 and is thus guided toward the right eye RE. On the right light guide plate 26, a half mirror 261 (reflection surface) situated in front of the right eye RE is formed. The image light L is reflected by the half mirror 261 and subsequently emitted from the right light guide plate 26 to the right eye RE. This image light L forms an image on the retina of the right eye RE, thus allowing the user to visually recognize the image.

As a configuration to allow the left eye LE to visually recognize an image (AR image), the left display unit 24 has an OLED unit 241 and a left optical system 252. The OLED unit 241 emits image light. The left optical system 252 has a lens group or the like and guides the image light L emitted from the OLED unit 241, to the left light guide plate 28. The OLED unit 241 has an OLED panel 243 and an OLED drive circuit 245 which drives the OLED panel 243. The details of these respective parts are the same as those of the OLED unit 221, the OLED panel 223, and the OLED drive circuit 225. A temperature sensor 239 (FIG. 5), described later, is mounted on a substrate fixed to the back side of the OLED panel 243. The details of the left optical system 252 are the same as those of the right optical system 251.

With the configuration described above, the HMD 100 can function as a see-through display device. That is, the image light L reflected by the half mirror 261 and external light OL transmitted through the right light guide plate 26 become incident on the right eye RE of the user. The image light L reflected by a half mirror 281 and external light OL transmitted through the left light guide plate 28 become incident on the left eye LE of the user. In this way, the HMD 100 causes the image light L of the image processed inside and the external light OL to become incident, as superimposed on each other, on the eyes of the user. As a result, the user sees the external scenery (real world) through the right light guide plate 26 and the left light guide plate 28 and visually recognizes an image (AR image) based on the image light L as superimposed on the external scenery.

The half mirror 261 and the half mirror 281 function as an "image extraction unit" which reflects the image light outputted from the right display unit 22 and the left display unit 24, respectively, and thus takes out an image. The right optical system 251 and the right light guide plate 26 are collectively referred to as a "right light guide unit". The left optical system 252 and the left light guide plate 28 are collectively referred to as a "left light guide unit". The configurations of the right light guide unit and the left light guide unit are not limited to the foregoing example. An arbitrary form can be used, provided that an image is formed in front of the eyes of the user, using image light. For the right light guide unit and the left light guide unit, for example, a diffraction grating may be used, or a semi-transmissive reflection film may be used.

In FIG. 1, the control device 10 and the image display unit 20 are connected together via a connection cable 40. The connection cable 40 is removably connected to a connector provided in a bottom part of the control device 10 and connects to various circuits inside the image display unit 20 from the distal end AL of the left holding part 23. The connection cable 40 has a metal cable or optical fiber cable which transmits digital data. The connection cable 40 may also include a metal cable which transmits analog data. A connector 46 is provided at a halfway point along the connection cable 40.

The connector 46 is a socket to connect a stereo mini plug. The connector 46 and the control device 10 are connected together, for example, via a line which transmits analog audio signals. In the example of this embodiment shown in FIG. 1, a headset 30 which includes a right earphone 32 and a left earphone 34 forming a stereo headphone and a microphone 63 is connected to the connector 46.

The microphone 63 is arranged in such a way that the sound collecting part of the microphone 63 faces the direction of the line of sight of the user, for example, as shown in FIG. 1. The microphone 63 collects sounds and outputs an audio signal to an audio interface 182 (FIG. 5). The microphone 63 may be a monaural microphone or stereo microphone, and may be a directional microphone or non-directional microphone.

The control device 10 is a device for controlling the HMD 100 (particularly the image display unit 20). The control device 10 includes a lighting part 12, a touch pad 14, a direction key 16, a decision key 17, and a power switch 18. The lighting part 12 notifies the operating state (for example, power ON/OFF or the like) of the HMD 100, by its light emitting mode. As the lighting part 12, for example, an LED (light emitting diode) can be used.

The touch pad 14 detects a touch operation on the operation screen of the touch pad 14 and outputs a signal corresponding to the detected content. As the touch pad 14, various touch pads such as electrostatic, pressure detection-type, and optical touch pads can be employed. The direction key 16 detects a press operation on keys corresponding to up, down, left and right directions and outputs a signal corresponding to the detected content. The decision key 17 detects a press operation and outputs a signal for deciding the content of the operation carried out on the control device 10. The power switch 18 switches the state of the power supply of the HMD 100 by detecting a slide operation of the switch.

Figure 3:
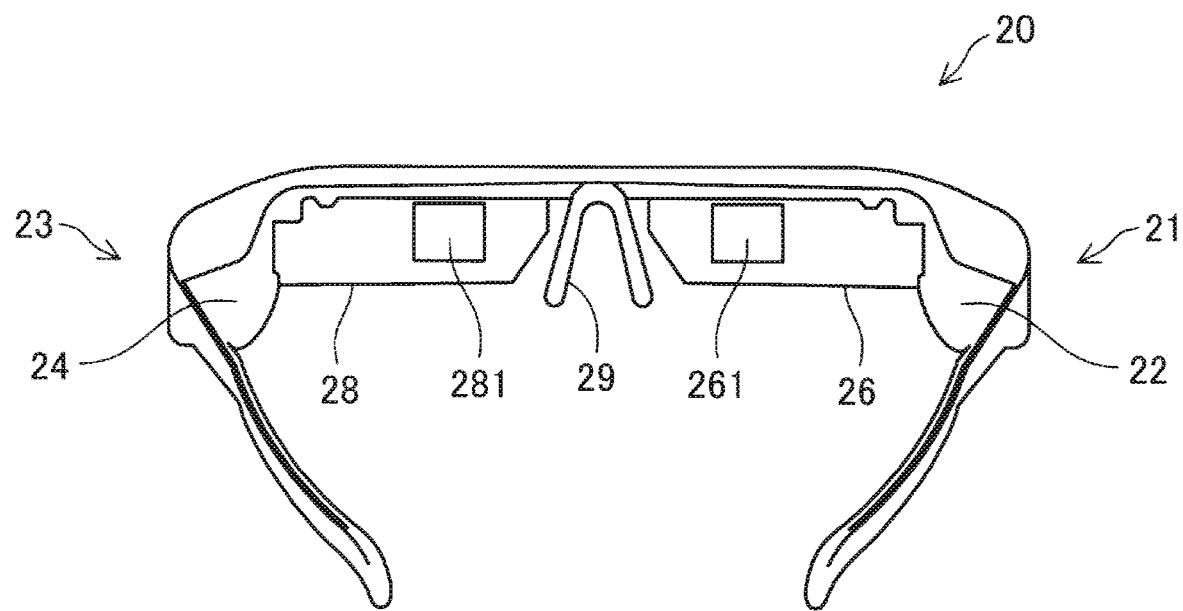
FIG. 3 shows the configuration of essential parts of the image display unit, as viewed from the user.

FIG. 3 shows the configuration of essential parts of the image display unit 20, as viewed from the user. In FIG. 3, the illustration of the connection cable 40, the right earphone 32, and the left earphone 34 is omitted. In the state shown in FIG. 3, the back sides of the right light guide plate 26 and the left light guide plate 28 can be visually recognized, and the half mirror 261 for casting image light to the right eye RE and the half mirror 281 for casting image light to the left eye LE can be visually recognized as substantially quadrilateral areas. The user visually recognizes the external scenery through the entirety of the left and right light guide plates 26, 28 including the half mirrors 261, 281, and also visually recognizes a rectangular display image at the positions of the half mirrors 261, 281.

Figure 4:
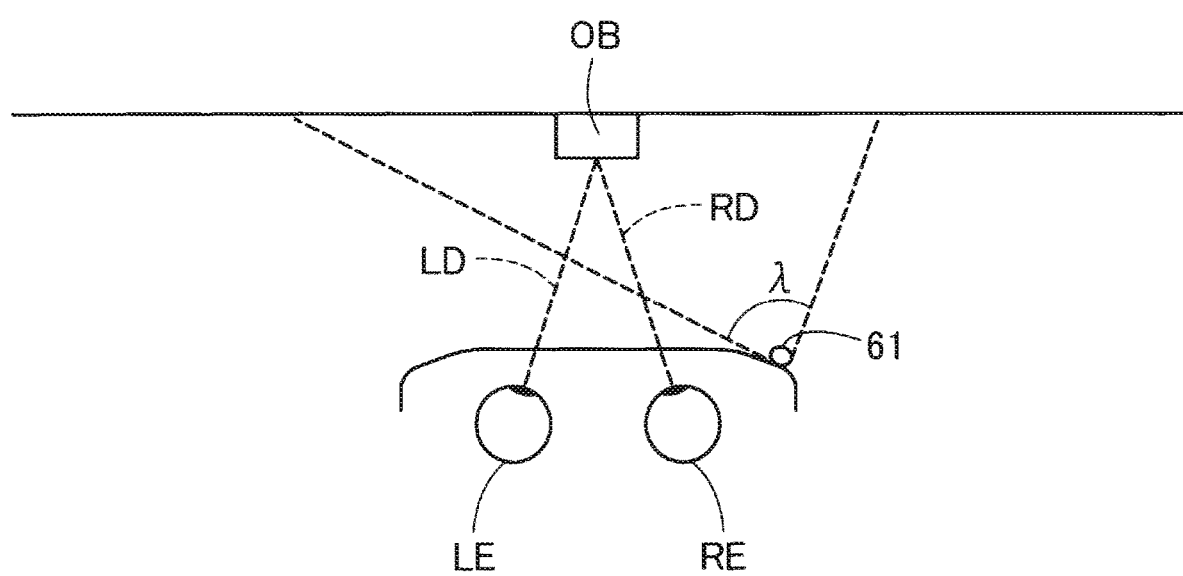
FIG. 4 explains the angle of view of a camera.

FIG. 4 explains the angle of view of the camera 61. In FIG. 4, the camera 61, and the right eye RE and the left eye LE of the user are schematically shown in a plan view, and the angle of view (image pickup range) of the camera 61 is indicated by λ. The angle of view λ of the camera 61 spreads in the horizontal direction as illustrated and also spreads in the vertical direction as with a general digital camera.

As described above, the camera 61 is arranged at the end part on the right-hand side of the image display unit 20, and picks up an image in the direction of the line of sight of the user (that is, in front of the user). Therefore, the optical axis of the camera 61 is in a direction including the directions of the lines of sight of the right eye RE and the left eye LE. The external scenery which the user can visually recognize when wearing the HMD 100 is not necessarily at infinity. For example, when the user gazes at an object OB with both eyes, the lines of sight of the user are directed to the object OB, as indicated by RD and LD in the illustration. In this case, the distance from the user to the object OB tends to be approximately 30 cm to 10 m, and more frequently, 1 m to 4 m. Thus, upper and lower limit benchmarks of the distance from the user to the object OB at the time of normal use may be defined for the HMD 100. The benchmarks may be found in advance and preset in the HMD 100, or may be set by the user. It is preferable that the optical axis and the angle of view of the camera 61 are set in such a way that the object OB is included in the angle of view when the distance to the object OB at the time of normal use corresponds to the set upper and lower limit benchmarks.

Generally, the human viewing angle is approximately 200 degrees horizontally and approximately 125 degrees vertically. Of this, the useful field of view, where an excellent information acceptance ability can be exerted, is approximately 30 degrees horizontally and approximately 20 degrees vertically. The stable fixation field, where a gazing point at which a human gazes can be viewed quickly and stably, is approximately 60 to 90 degrees horizontally and approximately 45 to 70 degrees vertically. In this case, when the gazing point is the object OB (FIG. 4), the useful field of view is approximately 30 degrees horizontally and approximately 20 degrees vertically, with the lines of sight RD, LD at its center. The stable fixation field is approximately 60 to 90 degrees horizontally and approximately 45 to 70 degrees vertically. The actual field of view which the user visually recognizes through the image display unit 20 and through the right light guide plate 26 and the left light guide plate 28 is referred to as FOV (field of view). The field of view is narrower than the viewing angle and the stable fixation field but broader than the useful field of view.

The angle of view λ of the camera 61 in this embodiment is set in such a way as to be able to pick up an image over a broader range than the field of view of the user. Preferably, the angle of view λ of the camera 61 may be set in such a way as to be able to pick up an image over at least a broader range than the useful field of view of the user. More preferably, the angle of view λ of the camera 61 may be set in such a way as to be able to pick up an image over a broader range than the field of view. Much more preferably, the angle of view λ of the camera 61 may be set in such a way as to be able to pick up an image over a broader range than the stable fixation field of the user. Most preferably, the angle of view λ of the camera 61 may be set in such a way as to be able to pick up an image over a broader range than the viewing angles of both eyes of the user. Therefore, the camera 61 may have a so-called wide-angle lens as an image pickup lens and thus may be configured to be able to pick up an image over a broad angle of view. The wide-angle lens may include a lens called an ultra-wide-angle lens or quasi-wide-angle lens. The camera 61 may also include a monofocal lens or a zoom lens, and may include a lens group made up of a plurality of lenses.

FIG. 5 is a block diagram showing the electrical configuration of the HMD 100. The control device 10 includes a main processor 140 which executes a program and controls the HMD 100, a storage unit, an input/output unit, sensors, an interface, and a power supply unit 130. The storage unit, the input/output unit, the sensors, the interface, and the power supply unit 130 are connected to the main processor 140. The main processor 140 is mounted on a controller board 120 built in the control device 10.

The storage unit includes a memory 118 and a non-volatile storage unit 121. The memory 118 forms a work area for temporarily storing a computer program executed by the main processor 140 and data processed by the main processor 140. The non-volatile storage unit 121 is configured of a flash memory or eMMC (embedded multimedia card). The non-volatile storage unit 121 stores a computer program executed by the main processor 140 and various data processed by the main processor 140. In this embodiment, these storage units are mounted on the controller board 120.

The input/output unit includes the touch pad 14 and an operation unit 110. The operation unit 110 includes the direction key 16, the decision key 17, and the power switch 18 provided in the control device 10. The main processor 140 controls each of these input/output units and acquires a signal outputted from each of the input/output units.

The sensors include a 6-axis sensor 111, a magnetic sensor 113, and a GPS (global positioning system) receiver 115. The 6-axis sensor 111 is a motion sensor (inertial sensor) having a 3-axis acceleration sensor and a 3-axis gyro (angular velocity) sensor. As the 6-axis sensor 111, an IMU (inertial measurement unit) in which these sensors are formed as modules may be employed. The magnetic sensor 113 is, for example, a 3-axis geomagnetic sensor. The GPS receiver 115 has a GPS antenna, not illustrated, and thus receives radio signals transmitted from GPS satellites and detects the coordinates of the current location of the control device 10. These sensors (6-axis sensor 111, magnetic sensor 113, GPS receiver 115) output detected values to the main processor 140 according to a sampling frequency designated in advance. The timing when each sensor outputs a detected value may be in response to an instruction from the main processor 140.

The interface includes a wireless communication unit 117, an audio codec 180, an external connector 184, an external memory interface 186, a USB (universal serial bus) connector 188, a sensor hub 192, an FPGA 194, and an interface 196. These components function as interfaces to the outside. The wireless communication unit 117 executes wireless communication between the HMD 100 and an external device. The wireless communication unit 117 includes an antenna, an RF circuit, a baseband circuit, a communication control circuit and the like, not illustrated. Alternatively, the wireless communication unit 117 is configured as a device in which these components are integrated. The wireless communication unit 117 carries out wireless communication conforming to a wireless LAN standard including, for example, Bluetooth (trademark registered) or Wi-Fi (trademark registered).

The audio codec 180 is connected to an audio interface 182 and encodes or decodes an audio signal inputted or outputted via the audio interface 182. The audio interface 182 is an interface for inputting or outputting an audio signal. The audio codec 180 may have an A/D converter which converts an analog audio signal into digital audio data, or a D/A converter which carries out reverse conversion. The HMD 100 in this embodiment outputs a sound from the right earphone 32 (FIG. 1) and the left earphone 34 and collects a sound with the microphone 63. The audio codec 180 converts digital audio data outputted from the main processor 140 into an analog audio signal and outputs the analog audio signal via the audio interface 182. Also, the audio codec 180 converts an analog audio signal inputted to the audio interface 182 into digital audio data and outputs the digital audio data to the main processor 140.

The external connector 184 is a connector for connecting, to the main processor 140, an external device (for example, a personal computer, smartphone, game machine or the like) which communicates with the main processor 140. The external device connected to the external connector 184 can be a source of a content and can also be used to debug a computer program executed by the main processor 140 or to collect operation logs of the HMD 100. The external connector 184 can employ various forms. As the external connector 184, for example, an interface supporting wired connection such as a USB interface, micro USB interface or memory card interface, or an interface supporting wireless connection such as a wireless LAN interface or Bluetooth interface can be employed.

The external memory interface 186 is an interface to which a portable memory device can be connected. The external memory interface 186 includes, for example, a memory card slot in which a card-type recording medium is loaded to read or write data, and an interface circuit. The size, shape, standard and the like of the card-type recording medium can be suitably selected. The USB connector 188 is an interface to which a memory device, smartphone, personal computer or the like conforming to the USB standard can be connected.

The USB connector 188 includes, for example, a connector conforming to the USB standard, and an interface circuit. The size, shape, USB standard version and the like of the USB connector 188 can be suitably selected.

The sensor hub 192 and the FPGA 194 are connected to the image display unit 20 via the interface (I/F) 196. The sensor hub 192 acquires detected values from various sensors provided in the image display unit 20 and outputs the detected values to the main processor 140. The FPGA 194 executes processing of data sent and received between the main processor 140 and each part of the image display unit 20 and transmission of the data via the interface 196. The interface 196 is connected to each of the right display unit 22 and the left display unit 24 of the image display unit 20. In the example of this embodiment, the connection cable 40 (FIG. 1) is connected to the left holding part 23, and a wire leading to this connection cable 40 is laid inside the image display unit 20. Each of the right display unit 22 and the left display unit 24 is connected to the interface 196 of the control device 10.

The HMD 100 also has a vibrator 19. The vibrator 19 has a motor and an eccentric rotor or the like, not illustrated, and generates vibration under the control of the main processor 140. For example, when an operation on the operation unit 110 is detected or when the power of the HMD 100 is switched on/off, or the like, the HMD 100 causes the vibrator 19 to generate vibration in a predetermined vibration pattern.

The power supply unit 130 includes a battery 132 and a power supply control circuit 134. The power supply unit 130 supplies electric power for the control device 10 to operate. The battery 132 is a rechargeable battery. The power supply control circuit 134 detects the remaining capacity of the battery 132 and controls the recharging of the battery 132. The power supply control circuit 134 is connected to the main processor 140 and outputs the detected value of the remaining capacity of the battery 132 and the detected value of the voltage of the battery 132 to the main processor 140. Based on the electric power supplied by the power supply unit 130, electric power may be supplied from the control device 10 to the image display unit 20. The main processor 140 may be configured to be able to control the state of supply of electric power from the power supply unit 130 to each part of the control device 10 and the image display unit 20.

The right display unit 22 has a display unit board 210, the OLED unit 221, the camera 61, an illuminance sensor 65, an LED indicator 67, and a temperature sensor 217. On the display unit board 210, an interface (I/F) 211 connected to the interface 196, a receiving unit (Rx) 213, and an EEPROM (electrically erasable programmable read-only memory) 215 are mounted. The receiving unit 213 receives data inputted from the control device 10 via the interface 211. When image data of an image to be displayed by the OLED unit 221 is received, the receiving unit 213 outputs the received image data to the OLED drive circuit 225 (FIG. 2).

The EEPROM 215 stores various data in a form readable by the main processor 140. The EEPROM 215 stores, for example, data about light emission characteristics and display characteristics of the OLED units 221, 241 of the image display unit 20, and data about sensor characteristics of the right display unit 22 and the left display unit 24, or the like. Specifically, the EEPROM 215 stores, for example, a parameter for gamma correction of the OLED units 221, 241, and data for compensating for detected values from the temperature sensors 217, 239 described later, or the like. These data are generated by an inspection and written in the EEPROM 215 at the time of shipping the HMD 100 from the plant. After the shipping, the main processor 140 reads the data in the EEPROM 215 and uses the data for various kinds of processing.

The camera 61 executes image pickup according to a signal inputted via the interface 211 and outputs picked-up image data or a signal indicating the result of the image pickup to the control device 10. The illuminance sensor 65 is provided at the end part ER of the front frame 27 and arranged in such a way as to receive external light from the front of the user wearing the image display unit 20, as shown in FIG. 1. The illuminance sensor 65 outputs a detected value corresponding to the amount of light received (intensity of received light). The LED indicator 67 is arranged near the camera 61 at the end part ER of the front frame 27, as shown in FIG. 1. The LED indicator 67 turns on during the execution of image pickup by the camera 61 and thus reports that image pickup is in progress.

The temperature sensor 217 detects temperature and outputs a voltage value or resistance value corresponding to the detected temperature. The temperature sensor 217 is mounted on the back side of the OLED panel 223 (FIG. 3). The temperature sensor 217 may be mounted, for example, on the same substrate as the OLED drive circuit 225. With this configuration, the temperature sensor 217 mainly detects the temperature of the OLED panel 223. Also, the temperature sensor 217 may be built in the OLED panel 223 or the OLED drive circuit 225. For example, if the OLED panel 223 as a Si-OLED is mounted along with the OLED drive circuit 225 as an integrated circuit on an integrated semiconductor chip, the temperature sensor 217 may be mounted on this semiconductor chip.

The left display unit 24 has a display unit board 230, the OLED unit 241, and a temperature sensor 239. On the display unit board 230, an interface (I/F) 231 connected to the interface 196, a receiving unit (Rx) 233, a 6-axis sensor 235, and a magnetic sensor 237 are mounted. The receiving unit 233 receives data inputted from the control device 10 via the interface 231. When image data of an image to be displayed by the OLED unit 241 is received, the receiving unit 233 outputs the received image data to the OLED drive circuit 245 (FIG. 2).

The 6-axis sensor 235 is a motion sensor (inertial sensor) having a 3-axis acceleration sensor and a 3-axis gyro (angular velocity) sensor. As the 6-axis sensor 235, an IMU sensor in which the above sensors are formed as modules may be employed. The magnetic sensor 237 is, for example, a 3-axis geomagnetic sensor. The 6-axis sensor 235 and the magnetic sensor 237 are provided in the image display unit 20 and therefore detect a movement of the head of the user when the image display unit 20 is mounted on the head of the user. Based on the detected movement of the head, the direction of the image display unit 20, that is, the field of vision of the user is specified.

The temperature sensor 239 detects temperature and outputs a voltage value or resistance value corresponding to the detected temperature. The temperature sensor 239 is mounted on the back side of the OLED panel 243 (FIG. 3). The temperature sensor 239 may be mounted, for example, on the same substrate as the OLED drive circuit 245. With this configuration, the temperature sensor 239 mainly detects the temperature of the OLED panel 243. The temperature sensor 239 may be built in the OLED panel 243 or the OLED drive circuit 245. The details of the temperature sensor 239 are similar to those of the temperature sensor 217.

The camera 61, the illuminance sensor 65 and the temperature sensor 217 of the right display unit 22, and the 6-axis sensor 235, the magnetic sensor 237 and the temperature sensor 239 of the left display unit 24 are connected to the sensor hub 192 of the control device 10. The sensor hub 192 carries out setting of a sampling frequency and initialization of each sensor under the control of the main processor 140. The sensor hub 192 executes energization of each sensor, transmission of control data, acquisition of a detected value or the like, according to the sampling period of each sensor. The sensor hub 192 outputs the detected value from each sensor provided in the right display unit 22 and the left display unit 24 to the main processor 140 at a preset timing. The sensor hub 192 may have a cache function to temporarily hold the detected value from each sensor. The sensor hub 192 may have a signal format or data format conversion function (for example, to convert to a unified format) for the detected value from each sensor.

The FPGA 194 starts or stops the energization of the LED indicator 67 under the control of the main processor 140 and thus causes the LED indicator 67 to turn on or off.

FIG. 6 is a block diagram functionally showing the configuration of the control device 10. Functionally, the control device 10 has a storage function unit 122 and a control function unit 150. The storage function unit 122 is a logical storage unit configured of the non-volatile storage unit 121 (FIG. 5). The storage function unit 122 may have a configuration using the EEPROM 215 and the memory 118 in combination with the non-volatile storage unit 121, instead of the configuration using only the non-voltage storage unit 121. The control function unit 150 is configured by the main processor 140 executing a computer program, that is, by hardware and software collaborating with each other.

In the storage function unit 122, various data used for processing in the control function unit 150 are stored. Specifically, in the storage function unit 122 in this embodiment, setting data 123 and content data 124 are stored. The setting data 123 includes various setting values related to the operation of the HMD 100. For example, the setting data 123 includes a parameter, determinant, arithmetic expression, LUT (lookup table) or the like used when the control function unit 150 controls the HMD 100.

The content data 124 includes data of a content (image data, video data, audio data or the like) including an image or video to be displayed by the image display unit 20 under the control of the control function unit 150. The content data 124 may include data of a bidirectional content. The bidirectional content refers to a content of such a type that an operation by the user is acquired via the operation unit 110, then processing corresponding to the content of the acquired operation is executed by the control function unit 150, and a content corresponding to the content of the processing is displayed by the image display unit 20. In this case, the data of the content can include image data of a menu screen for acquiring the operation by the user, and data for deciding processing corresponding to an item included in the menu screen, and the like.

The control function unit 150 executes various kinds of processing using the data stored in the storage function unit 122, and thus executes the functions of an OS 143, an image processing unit 145, a display control unit 147, an image pickup control unit 149, an input/output control unit 151, a communication control unit 153, and a character input unit 155. In this embodiment, each of the functional units other than the OS 143 is configured as a computer program executed on the OS 143.

The image processing unit 145 generates a signal to be transmitted to the right display unit 22 and the left display unit 24, based on image data of an image or video to be displayed by the image display unit 20. The signal generated by the image processing unit 145 may be a vertical synchronization signal, horizontal synchronization signal, clock signal, analog image signal or the like. The image processing unit 145 may be realized by the main processor 140 executing a computer program, or may be configured of hardware (for example, DSP (digital signal processor)) other than the main processor 140.

The image processing unit 145 may execute resolution conversion processing, image adjustment processing, 2D/3D conversion processing or the like, according to need. The resolution conversion processing is processing to convert the resolution of image data to a resolution suitable for the right display unit 22 and the left display unit 24. The image adjustment processing is processing to adjust the luminance and saturation of image data. The 2D/3D conversion processing is processing to generate two-dimensional image data from three-dimensional image data, or to generate three-dimensional image data from two-dimensional image data. In the case where such processing is executed, the image processing unit 145 generates a signal for displaying an image based on the image data resulting from the processing, and transmits the signal to the image display unit 20 via the connection cable 40.

The display control unit 147 generates a control signal to control the right display unit 22 and the left display unit 24, and with this control signal, controls the generation and emission of image light by each of the right display unit 22 and the left display unit 24. Specifically, the display control unit 147 controls the OLED drive circuits 225, 245 so as to cause the OLED panels 223, 243 to display an image. Based on a signal outputted from the image processing unit 145, the display control unit 147 performs control on the timing when the OLED drive circuits 225, 245 cause the OLED panels 223, 243 to display an image, and control on the luminance of the OLED panels 223, 243, or the like.

The image pickup control unit 149 controls the camera 61 to execute image pickup, generate picked-up image data, and store the picked-up image data temporarily in the storage function unit 122. If the camera 61 is configured as a camera unit including a circuit which generates picked-up image data, the image pickup control unit 149 acquires picked-up image data from the camera 61 and stores the picked-up image data temporarily in the storage function unit 122.

The input/output control unit 151 controls the touch pad 14 (FIG. 1), the direction key 16, and the decision key 17, where appropriate, and acquires an input command from these. The acquired command is outputted to the OS 143 or a computer program operating on the OS 143 along with the OS 143. The communication control unit 153 controls the wireless communication unit 117 to carry out wireless communication, for example, with the wristwatch-type wearable device 300.

The character input unit 155 is a function realized according to an application program operating on the OS 143. The character input unit 155 inputs Japanese characters in collaboration with the image processing unit 145, the display control unit 147, the input/output control unit 151, and the communication control unit 153. Specifically, the character input unit 155 causes the image display unit 20 to display a character input screen, described later, and accepts an operation on the character input screen from the input/output control unit 151, and thus carries out the input of Japanese characters. This enables the user to input Japanese characters on the character input screen by operating the direction key 16 and the decision key 17 provided on the control device 10. The character input unit 155 also accepts an operation on the character input screen from the wristwatch-type wearable device 300. This enables the user to input Japanese characters on the character input screen by operating the wristwatch-type wearable device 300. The input of Japanese characters using the wristwatch-type wearable device 300 will be described in detail later.

Figure 7:
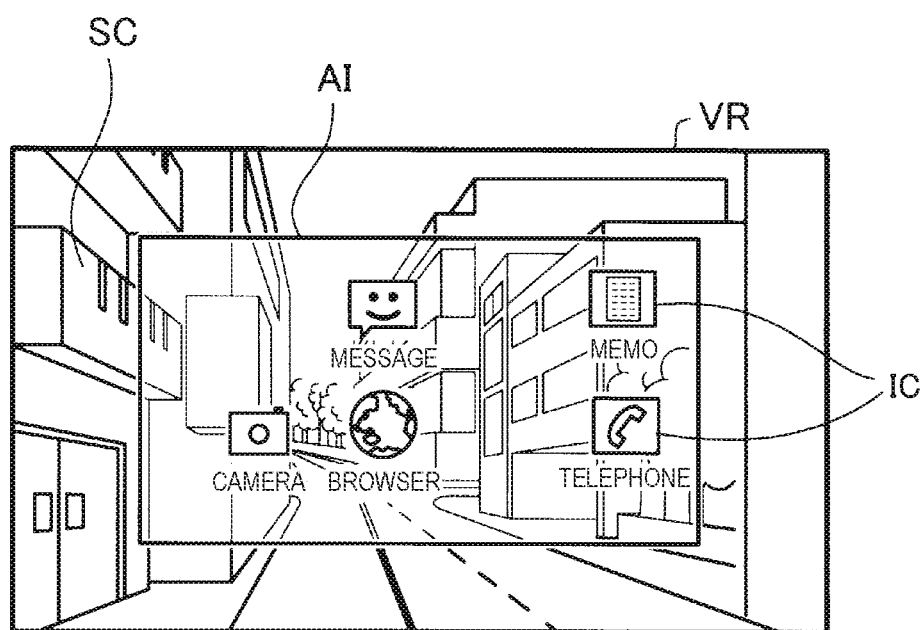
FIG. 7 is an explanatory view showing an example of the display of augmented reality by the HMD.

FIG. 7 is an explanatory view showing an example of the display of augmented reality by the HMD 100. In FIG. 7, an example of the field of vision VR of the user is illustrated. As image light guided to both eyes of the user of the HMD 100 forms an image on the retinas of the user, the user visually recognizes an image AI as augmented reality (AR), as described above. In the example of FIG. 7, the image AI is a menu screen of the OS of the HMD 100. The menu screen includes, for example, icons IC for starting up each of "message", "telephone", "camera", "browser", and "memo" application programs. Also, as the right and left light guide plates 26 and 28 transmit light from external scenery SC, the user visually recognizes the external scenery SC. In this way, the user of the HMD in this embodiment can see the image AI as superimposed on the external scenery SC, in the area where the image AI is displayed, of the field of vision VR. In the area where the image AI is not displayed, of the field of vision VR, the user can see the external scenery SC alone.

A-3. Configuration of Wristwatch-Type Wearable Device 300

As shown in FIG. 1, the wristwatch-type wearable device (hereinafter also referred to simply as "wristwatch-type device") 300 includes a face 310, a case 320 on which the face 310 is fixed, and a strap 330 connected to the case 320. The face 310 includes watch hands and a dial.

Figure 8:
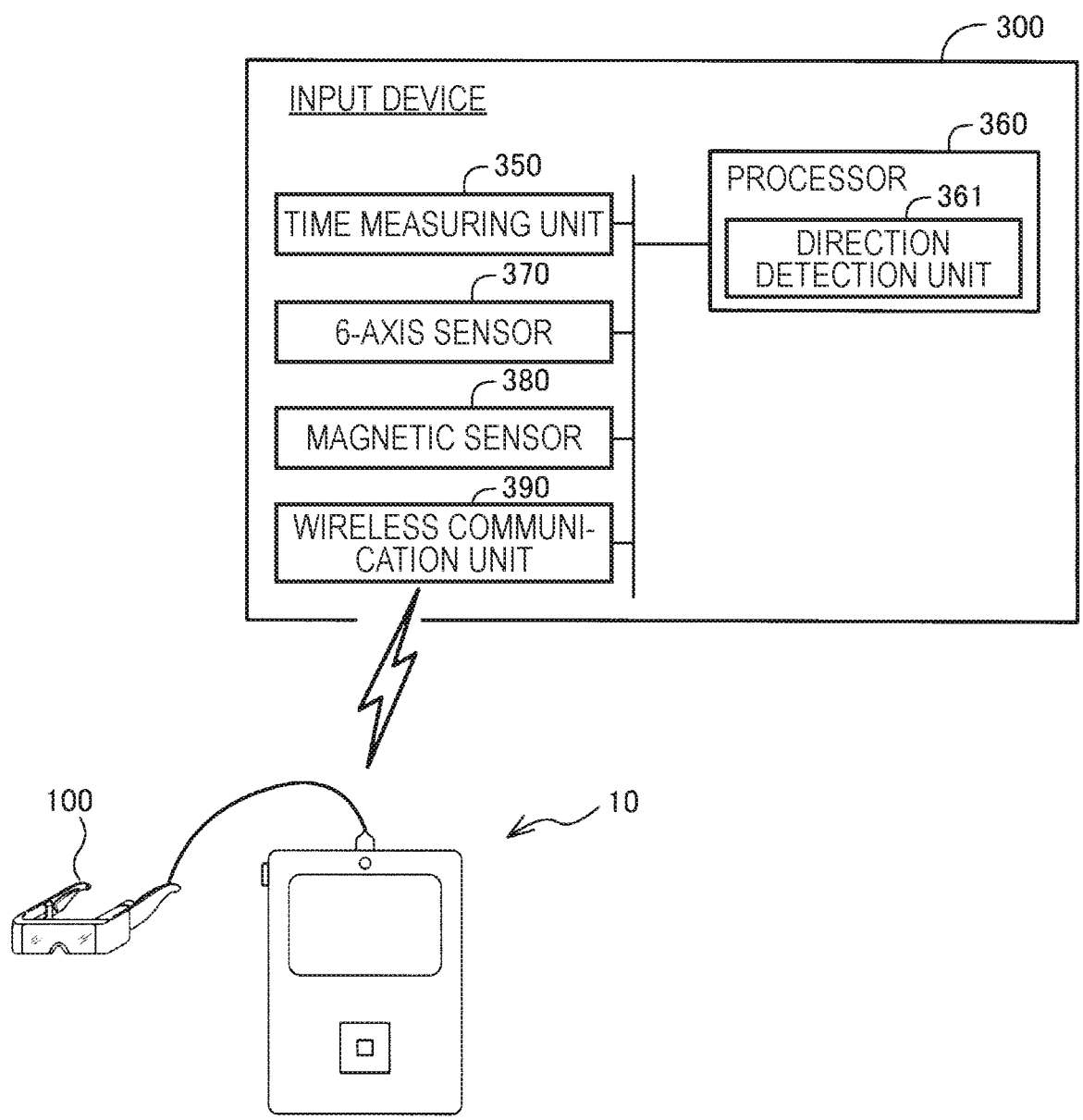
FIG. 8 is a block diagram showing the electrical configuration of a wristwatch-type device.

FIG. 8 is a block diagram showing the electrical configuration of the wristwatch-type device 300. As illustrated, the wristwatch-type device 300 has a time measuring unit 350, a processor 360, a 6-axis sensor 370, a magnetic sensor 380, and a wireless communication unit 390. The time measuring unit 350 measures the current time and drives the watch hands.

The processor 360 executes a program and controls the wristwatch-type device 300. The 6-axis sensor 370 is a motion sensor (inertial sensor) including a 3-axis acceleration sensor and a 3-axis gyro (angular velocity) sensor. As the 6-axis sensor 370, an IMU in which these sensors are formed as modules may be employed. The magnetic sensor 380 is, for example, a 3-axis geomagnetic sensor. The processor 360 functions as a direction detection unit 361 which detects the direction of the face 310 of the wristwatch-type device 300 (outward direction perpendicular to the face 310) by combining a detection signal of the 6-axis sensor 370 and a detection signal of the magnetic sensor 380. Based on the direction of the face 310, the movement in the circumferential direction of the arm of the user can be grasped. Therefore, the 6-axis sensor 370 and the direction detection unit 361 as a function of the processor 360 form a "movement detection unit" provided in the display system as an embodiment of the invention.

Instead of the processor 360, a processing device configured with an ASIC (application specific integrated circuit) or FPGA (field programmable gate array) can be employed.

The wireless communication unit 390 includes an antenna, an RF circuit, a baseband circuit, a communication control circuit and the like, not illustrated. Alternatively, the wireless communication unit 390 is configured as a device in which these components are integrated. The wireless communication unit 390 carries out wireless communication conforming to a wireless LAN standard including, for example, Bluetooth (trademark registered) or Wi-Fi (trademark registered). As a result, the wireless communication unit 390 can carry out wireless communication with the control device 10 provided in the HMD 100.

A-4. Character Input Processing

Figure 9:
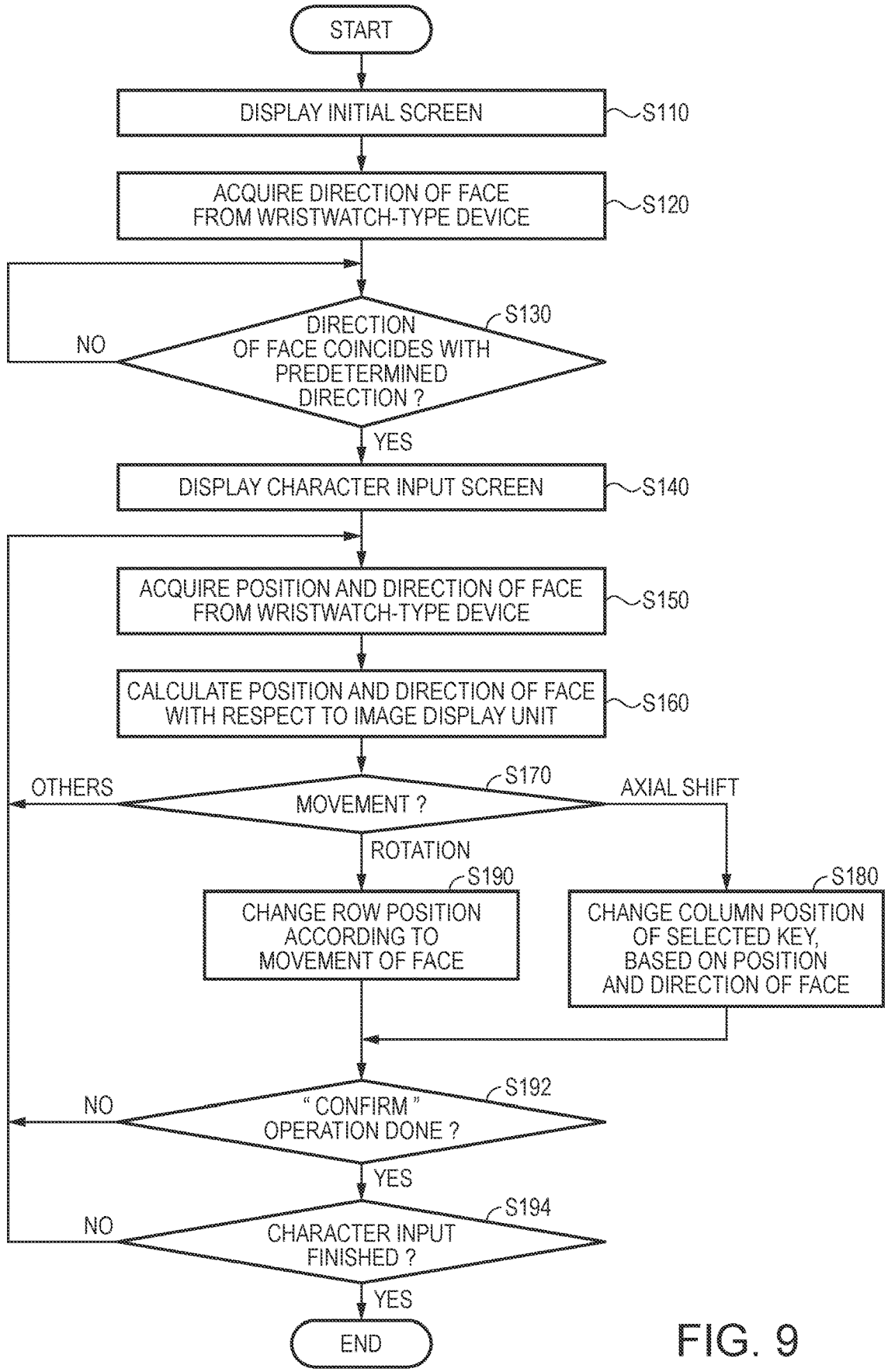
FIG. 9 is a flowchart showing character input processing.

FIG. 9 is a flowchart showing character input processing. This character input processing corresponds to a part of the character input unit 155 shown in FIG. 6 and is executed by the main processor 140 of the HMD 100. In response to the designation with the direction key 16 (FIG. 1) and the decision key 17 (FIG. 1) of the "memo" icon IC on the menu screen illustrated in FIG. 7, the execution of the character input processing is started.

As the processing is started, the main processor 140 of the HMD 100 first causes the image display unit 20 to display an initial screen of the "memo" (Step S110).

Figure 10:
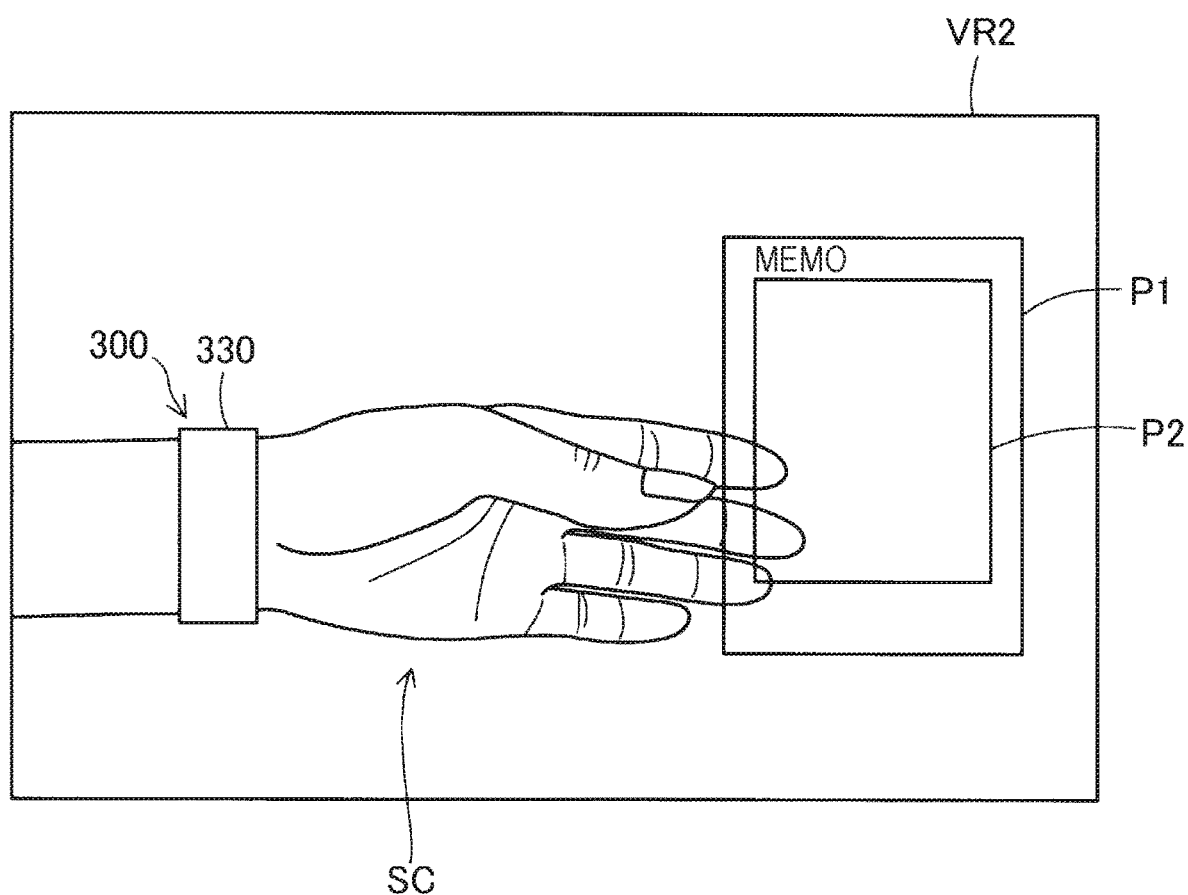
FIG. 10 is an explanatory view showing an example of a field of view that is visually recognized by a user.

FIG. 10 is an explanatory view showing an example of a field of view VR2 visually recognized by the user. As illustrated, the user visually recognizes the external scenery SC transmitted through the light guide plates 26 and 28 of the image display unit 20. The external scenery SC includes, for example, the arm of the user wearing the wristwatch-type device 300. As a result of Step S110 in FIG. 9, an initial screen P1 of the "memo" is displayed as superimposed on the external scenery SC. The initial screen P1 has a memo area P2 where an inputted character string is displayed.

Back to FIG. 9, the main processor 140 then acquires the direction of the face 310 from the wristwatch-type device 300 (Step S120). The direction of the face 310 is the direction detected by the direction detection unit 361 (FIG. 8). Subsequently, the main processor 140 determines whether the direction of the face 310 thus acquired coincides with a predetermined direction or not (Step S130). This determination is to determine whether an input start condition that triggers the start of character input is satisfied or not.

Figure 11:
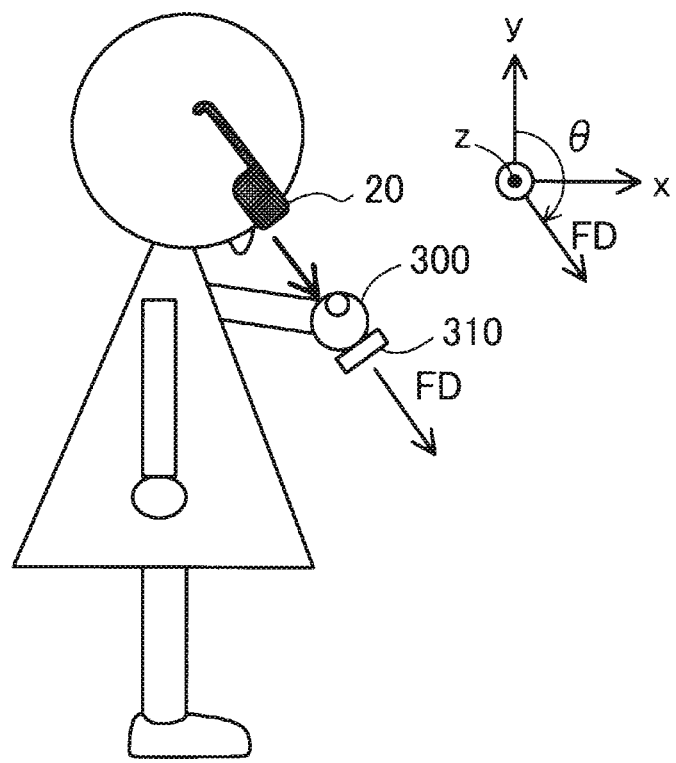
FIG. 11 is an explanatory view showing an example of the attitude of the user when starting character input.

FIG. 11 is an explanatory view showing an example of the attitude of the user when starting character input. In the illustration, an arrow x indicates a direction in front of the user. An arrow y indicates a direction above the user. An arrow z indicates a direction to the right of the user. That is, x, y, and z are relative directions based on the direction of the user. In this embodiment, it is assumed that character input is started when the user holds out an arm (forearm to the distal end from the elbow) in front of the chest as in looking at the watch and turns the direction FD of the face 310 of the wristwatch-type device 300 to the direction opposite to the direction at the time of looking at the watch, that is, in a front (+x) and downward (−y) direction, as illustrated. Specifically, in the case where, on the x-y coordinate system, the direction FD of the face 310 of the wristwatch-type device 300 is expressed by an angle of rotation θ about the origin with respect to the +y-axis (clockwise rotation corresponds to positive), it is determined that the condition for starting character input is satisfied if the angle of rotation θ is within a range of, for example, 90 to 180 degrees. However, this range is an example. Any range of angle can be employed, provided that the range does not include the angle at the time of looking at the watch.

The wristwatch-type device 300 also functions as a watch. Therefore, there are cases where the user may turn the direction of the face 310 toward him/herself in order to look at the time, having no intention to input characters. In this embodiment, in order to exclude such cases, the state where the direction FD of the face 310 is turned to the direction opposite to the user, that is, the front-downward direction with respect to the user (the foregoing range of 90 to 180 degrees), is regarded as an input start condition.

The direction FD of the face 310 obtained in Step S120 in FIG. 9 is an absolute direction. In contrast, the "predetermined direction" to be compared in Step S130 is a direction which is relative to the direction of the image display unit 20 and changes according to the direction of the user (that is, the direction of the image display unit 20). Therefore, in Step S130, the direction of the image display unit 20 (absolute direction) is found, based on the combination of the detection signal of the 6-axis sensor 235 (FIG. 5) and a detection signal of the magnetic sensor 237 (FIG. 5) provided in the image display unit 20, and whether the direction FD of the face 310 is the front-downward direction with respect to the user or not is determined, based on the direction of the image display unit 20 and the direction of the wristwatch-type device 300 obtained in Step S120.

If it is determined in Step S130 in FIG. 9 that the direction FD of the face 310 is the front-downward direction with respect to the user, the main processor 140 shifts the processing to Step S140. In Step S140, the main processor 140 carries out processing of causing the image display unit 20 to display a character input screen.

Figure 12:
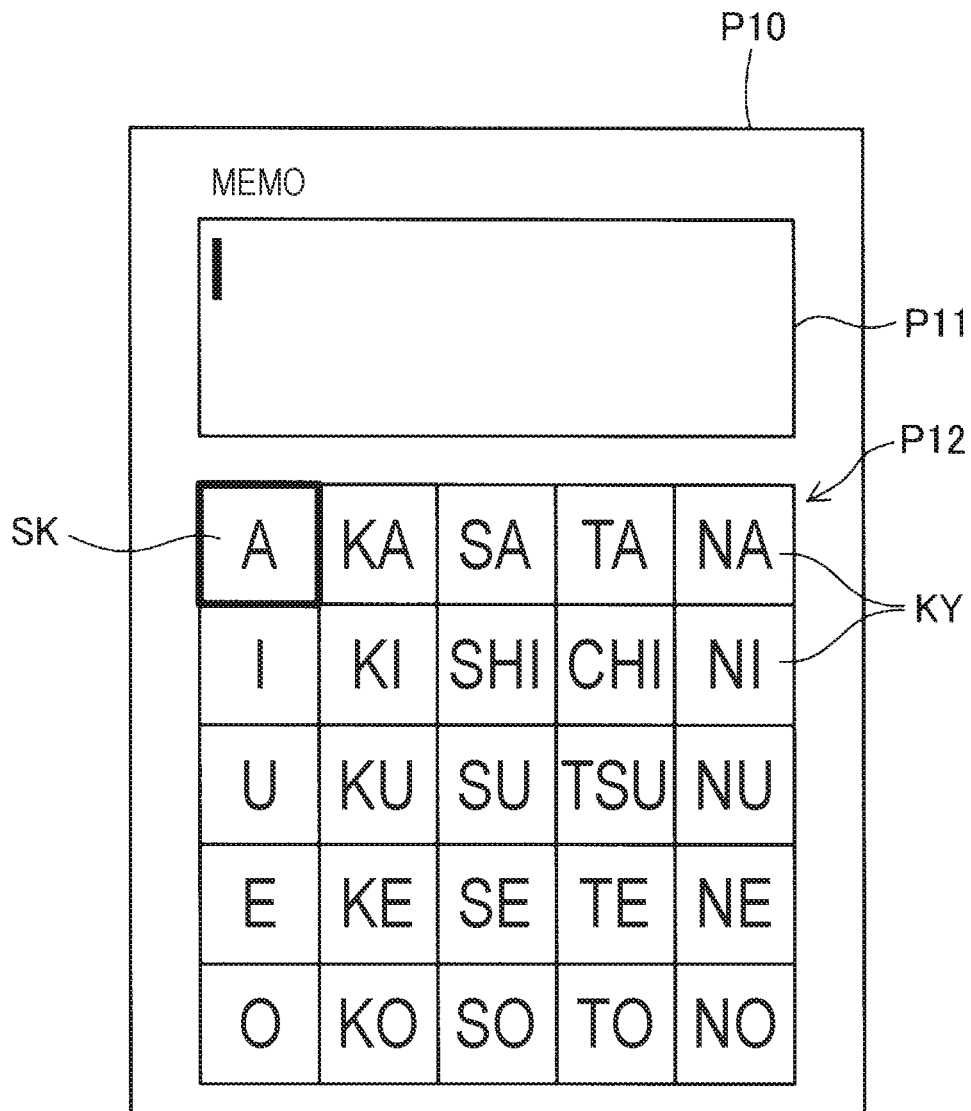
FIG. 12 is an explanatory view showing an example of a character input screen.

FIG. 12 is an explanatory view showing an example of a character input screen P10. The character input screen P10 is a screen accessed by a transition from the initial screen P1 shown in FIG. 10. The character input screen P10 includes a memo area P11 and a hiragana input board P12. The memo area P11 is an area where an inputted character string is displayed, and is equivalent to the memo area P2 on the initial screen P1.

The hiragana input board (hereinafter simply referred to as "input board") P12 has a configuration in which keys KY corresponding to the Japanese hiragana syllabary are arranged. Specifically, five keys KY are arrayed longitudinally, based on the vowels of hiragana, and ten keys KY are arranged laterally, based on the consonants. In practice, the input board P12 has only five keys KY laterally and is configured in such a way that hidden keys appear with the movement of a selected key (surrounded by a bold line in the illustration) SK. The selected key SK is a key indicating a selected character. The selected key SK is situated at a predetermined position (in this embodiment, in the top-left corner) at the beginning when the character input screen P10 is displayed, and is moved according to the movement of the wristwatch-type device 300. Details of this movement will be described later. While the Japanese hiragana syllabary is used in the embodiment, the Japanese katakana syllabary may be employed as well.

After the execution of Step S140 in FIG. 9, the main processor 140 acquires the position and direction of the face 310 from the wristwatch-type device 300 (Step S150). The direction of the face 310 is the direction detected by the direction detection unit 361 (FIG. 8). The processor 360 of the wristwatch-type device 300 detects the position of the face 310 in addition to the direction of the face 310 of the wristwatch-type device 300 by combining a detection signal of the 6-axis sensor 370 and a detection signal of the magnetic sensor 380. The main processor 140 also acquires the position of the face 310.

Next, the main processor 140 calculates the position and direction of the face 310 with respect to the image display unit 20 of the HMD 100 (Step S160). Specifically, the main processor 140 finds the absolute position and direction of the image display unit 20 by combining a detection signal of the 6-axis sensor 235 (FIG. 5) and a detection signal of the magnetic sensor 237 (FIG. 5) provided in the image display unit 20, and calculates the relative position and direction of the face 310 with respect to the image display unit 20, based on the absolute position and direction of the image display unit 20 and the position and direction of the wristwatch-type device 300 acquired in Step S150.

Subsequently, the main processor 140 finds a movement of the arm on which the wristwatch-type device 300 is mounted, based on the relative position and direction of the face 310 calculated in Step S160, and determines this movement (Step S170).

Figure 13:
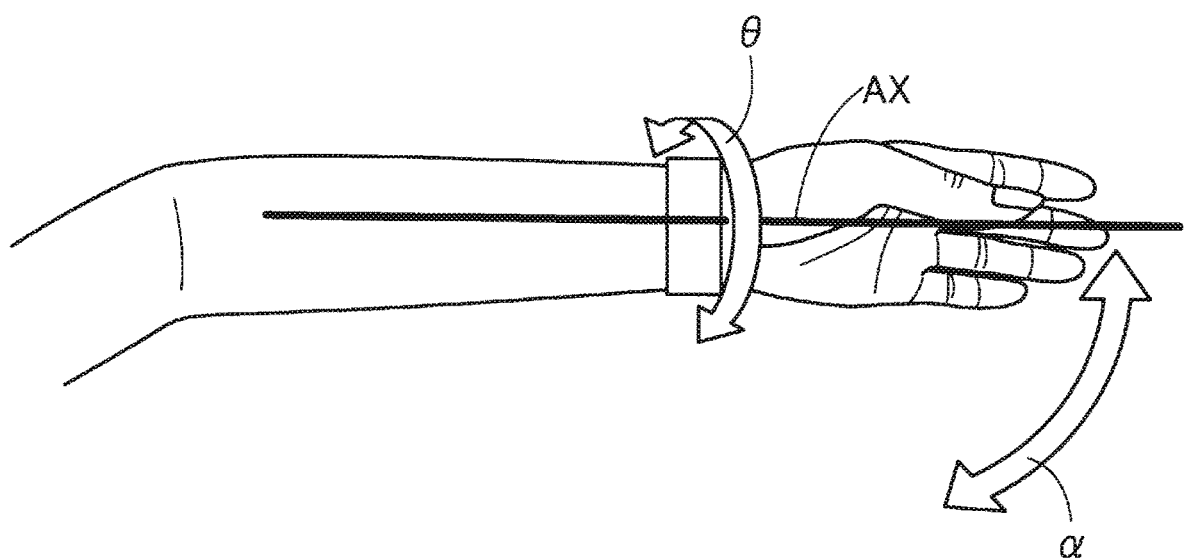
FIG. 13 is an explanatory view showing a movement of the forearm that can operate a hiragana input board.

FIG. 13 is an explanatory view showing movements of the forearm that can operate the input board P12. As illustrated, the user can move the forearm with the wristwatch-type device 300 mounted thereon, in such a way that the gradient α of an axial line AX of the forearm changes or in such a way that the angle of rotation θ in the circumferential direction of the wrist changes. The gradient α of the axial line AX of the forearm is expressed as 0 degrees when the arm is extended (when the upper arm and the forearm are in a straight line), and is expressed by a bending angle (angle formed by the direction of the upper arm and the direction of the forearm) when the arm is bent (when the forearm is turned about the elbow). The "axial line of the forearm" is the center axis of the forearm and roughly coincides with the ulna of the forearm. The "circumferential direction of the wrist" is a circumferential direction about the axial line. Hereinafter, a movement that changes the gradient α of the axial line AX of the forearm is referred to as "axial shift", and a movement that changes the angle of rotation θ in the circumferential direction of the wrist is referred to as "rotation". In Step S170 in FIG. 9, which of "axial shift", "rotation", and "others" the movement of the arm of the user corresponds to is determined, based on the relative position and direction of the face 310 calculated in Step S160.

If it is determined in Step S170 that the movement of the arm of the user is the "axial shift", the main processor 140 estimates the gradient α of the axial line AX of the forearm (FIG. 13), based on the relative position and direction of the face 310 with respect to the image display unit 20 calculated in Step S160, and changes the column position of the selected key SK on the input board P12 (Step S180).

FIG. 14 is an explanatory view showing the state where the selected key SK is changed on the input board P12. When the gradient α of the axial line AX of the forearm is changed, the selected key SK shifts laterally and the column position changes. Specifically, the range of possible movement of the forearm from the elbow as the point of origin when the arm is bent is equally divided into ten sub-ranges corresponding to the number of the consonants, and each column position is allocated to each of the equally divided sub-ranges. As the angle increases, the column position proceeds in order from the あ (a)-column to the か (ka)-column, さ (sa)-column, た (ta)-column and the like. Data of the column position allocated to each sub-range is stored in advance in the form of a table in the memory 118 of the control device 10. In Step S180, the estimated gradient α of the axial line AX is collated with the table stored in the memory 118. Thus, the sub-range that includes the gradient α is specified and the column position allocated to the specified sub-range is extracted. Then, the selected key SK is shifted to the extracted column position.

If it is determined in Step S170 in FIG. 9 that the movement of arm of the user is the "rotation", the main processor 140 estimates the angle of rotation θ of the wrist (FIG. 13), based on the relative position and direction of the face 310 with respect to the image display unit 20 calculated in Step S160, and changes the row position of the selected key SK on the input board P12 according to the angle of rotation (Step S190). The angle of rotation θ of the wrist is equivalent to the angle of rotation θ indicating the direction FD of the face 310 shown in FIG. 11.

When the angle of rotation θ of the wrist is changed, the selected key SK shifts longitudinally and the row position changes in FIG. 14. Specifically, the range of possible rotation of the wrist is equally divided into five sub-ranges corresponding to the number of the vowels, and each row position is allocated to each of the equally divided sub-ranges. Data of the row position allocated to each sub-range is stored in advance in the form of a table in the memory 118 of the control device 10. In Step S190, the estimated angle of rotation θ of the wrist is collated with the table stored in the memory 118. Thus, the sub-range that includes the angle of rotation θ of the wrist is specified and the row position allocated to the specified sub-range is extracted. Then, the selected key SK is shifted to the extracted row position.

Figure 15:
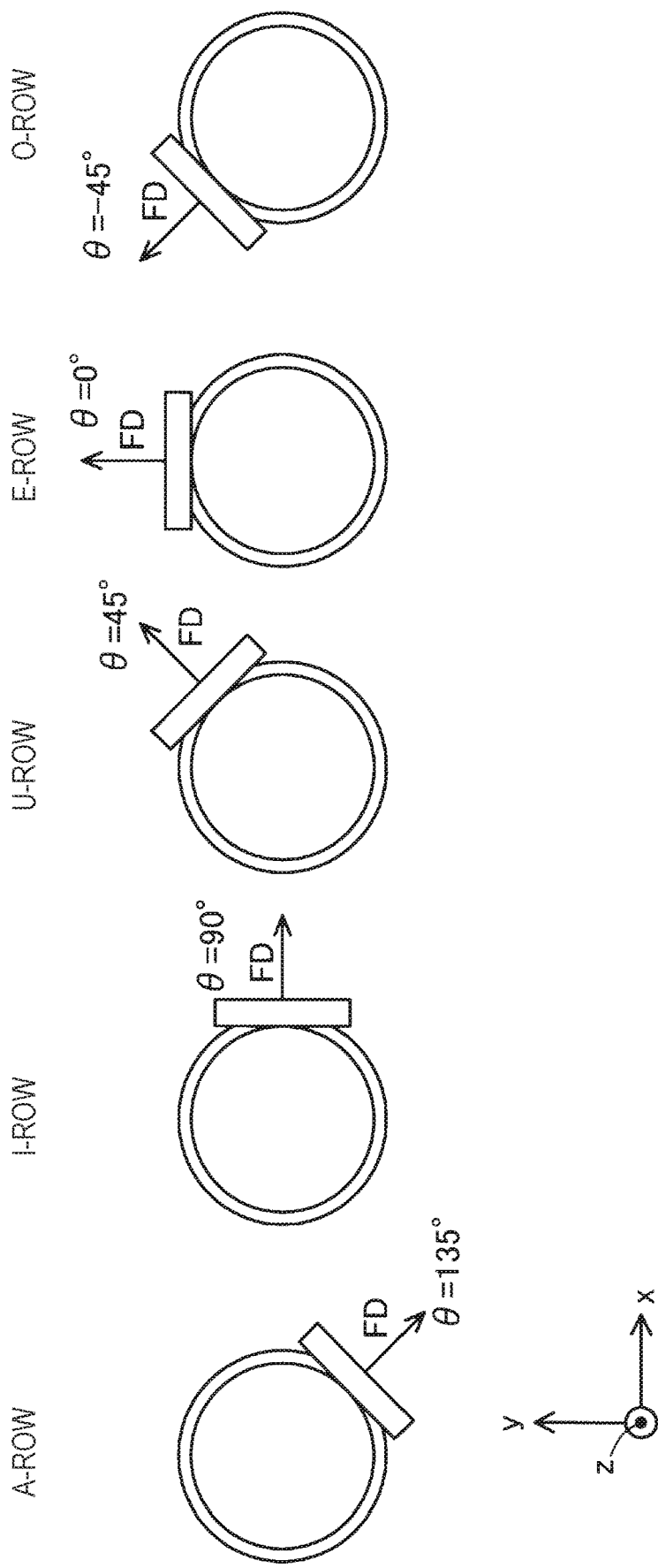
FIGS. 15A to 15E are explanatory views specifically showing the relationship between the angle of rotation of the wrist and the row position.

FIGS. 15A to 15E are explanatory views specifically showing the relationship between the angle of rotation θ of the wrist and the row position. If the range of possible rotation of the wrist is a range from a rear-upward direction (θ=−45 degrees) to a front-downward direction (θ=+135 degrees), the row position is the "あ(a)-row" when the direction FD of the face 310 is the front-downward direction (θ=+135 degrees) as shown in FIG. 15A. The row position is the "い (i)-row" when the direction FD of the face 310 is the front direction (θ=+90 degrees) as shown in FIG. 15B. The row position is the "う(u)-row" when the direction FD of the face 310 is the front-upward direction (θ=+45 degrees) as shown in FIG. 15C. The row position is the "え (e)-row" when the direction FD of the face 310 is the upward direction (θ=+0 degrees) as shown in FIG. 15D. The row position is the "お (o)-row" when the direction FD of the face 310 is the rear-upward direction (θ=−45 degrees) as shown in FIG. 15E.

More specifically, the row position is the "あ(a)-row" when +99 degrees≤θ≤+135 degrees holds, the "い (i)-row" when +63 degrees≤θ<+99 degrees holds, the "う(u)-row" when +27 degrees≤θ<+63 degrees holds, the "え (e)-row" when −9 degrees≤θ<+27 degrees holds, and the "お (o)-row" when −45 degrees≤θ<−9 degrees holds.

On the input board P12, the direction in which the row position changes is the longitudinal direction. Meanwhile, the user holds out the forearm in front of the chest as in looking at the watch, and subsequently rotates the wrist. Therefore, the direction of rotation of the wrist, that is, the direction in which the angle of rotation θ changes, coincides with the direction in which the selected key SK shifts on the input board P12. The reason for holding the forearm in front of the chest and subsequently rotating the wrist is that, in this embodiment, the operation of holding out the forearm in front of the chest and turning the direction of the face to the side opposite to the user him/herself triggers the start of character input.

After the execution of Step S180 or Step S190 in FIG. 9, the main processor 140 determines whether an operation to confirm the selected key SK shifted in position is carried out or not (Step S192). In this embodiment, the confirmation operation is decided in advance as a knocking action in which the user knocks on a door with the wrist. In Step S192, the position and direction of the face 310 is acquired from the wristwatch-type device 300, and whether a knocking action is made or not is determined, based on the position and direction thus acquired. If it is determined that a knocking action is made, it is regarded that the confirmation operation is carried out.

If it is determined in Step S192 that the confirmation operation is not carried out, the processing returns to Step S150 and the operation of changing the position of the selected key SK by the wristwatch-type device 300 is executed repeatedly. If it is determined in Step S192 that the confirmation operation is carried out, the processing shifts to Step S194.

If it is determined in Step S170 that tie movement of the arm of the user is neither "rotation" nor "axial shift", the processing returns to Step S150 and the operation of changing the position of the selected key SK by the wristwatch-type device 300 is carried out anew.

Figure 16:
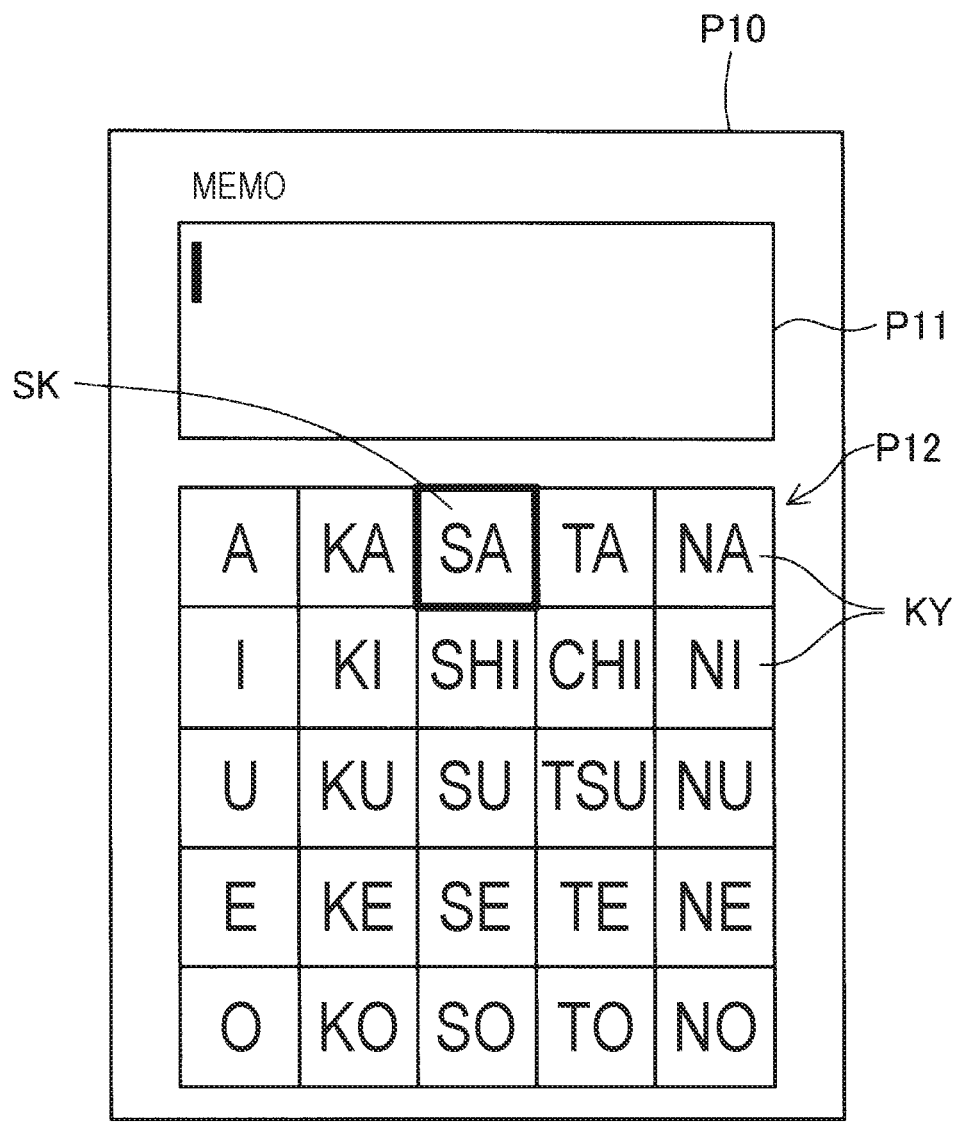
FIG. 16 is an explanatory view showing a transition of character input.
Figure 17:
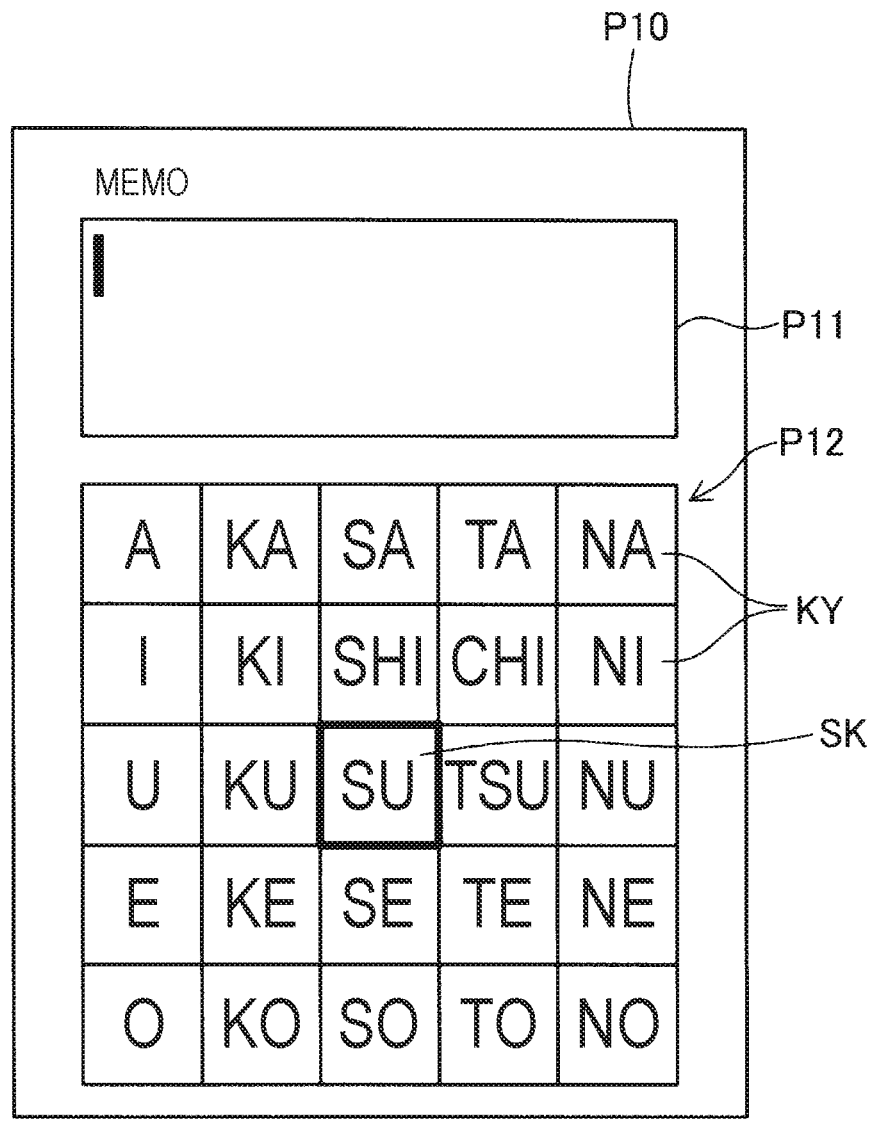
FIG. 17 is an explanatory view showing a transition of character input.
Figure 18:
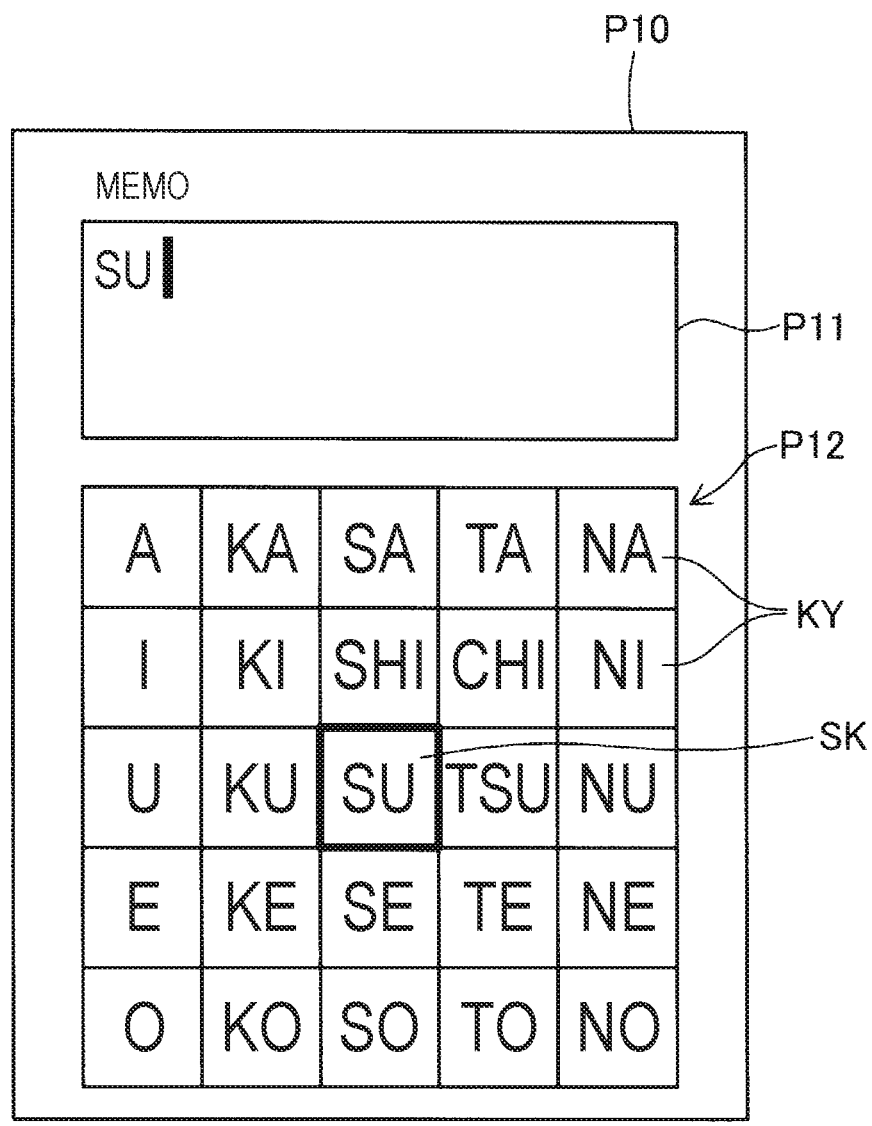
FIG. 18 is an explanatory view showing a transition of character input.

FIGS. 16 to 18 are explanatory views showing a transition of character input. It is now assumed that the character input screen P10 is in the state shown in FIG. 12. An operation procedure for inputting the character "す (su)" (in Japanese) is as follows. The user first carries out an operation of bending the arm at the elbow and thus shifts the selected key SK to the "さ (sa)-column". As a result, the selected key SK specifies the character "さ(sa)", as shown in FIG. 16. Next, the user carries out an operation of rotating the wrist and thus shifts the selected key SK to the "う(*u*)-row". As a result, the selected key SK specifies the character "す (su)", as shown in FIG. 17. Then, the user makes a knocking action and thus can confirm the character "す (*su*)" specified by the selected key SK. As a result, the character "す (*su*)" is inputted in the memo area P11, as shown in FIG. 18.

A-5. Advantageous Effects of Embodiment

With the display system according to the first embodiment configured as described above, the user can change the row position to change the vowel on the input board P12 by rotating the arm with the wristwatch-type device 300 mounted thereon, in the circumferential direction, and can change the column position to change the consonant on the input board P12 by bending the arm at the elbow. The movement in the circumferential direction of the arm is a simple movement in one direction and is a relatively large movement. Therefore, an advanced detection function is not needed to this. The movement of bending the arm, too, is a simple movement and is a relatively large movement. Therefore, an advanced detection function is not needed for this. Also, the detection functions for these movements are provided on the side of the wristwatch-type device 300. Therefore, when an operation on the input board P12 of the HMD 100 is carried out, the processing load on the HMD 100 can be reduced. Also, since the user can input Japanese hiragana characters simply by moving the arm with the wristwatch-type device 300 mounted thereon, the HMD 100 with excellent operability is provided.

With the display system according to this embodiment, an input operation is carried out in such a way that the direction of rotation of the wrist, that is, the direction in which the angle of rotation θ changes, coincides with the direction in which the selected key SK is shifted on the input board P12. Therefore, the user can intuitively operate the wristwatch-type device 300. As a result, the HMD 100 with excellent operability is provided.

Moreover, in the embodiment, the row position is switched to the "あ(*a*)-row" when the direction of the face 310 of the wristwatch-type device 300 is the front-downward direction with respect to the user, and the row position is switched to the "お (*o*)-row" when the direction of the face is the rear-upward direction with respect to the user. When rotating the wrist in the circumferential direction, the operation of turning the direction of the face 310 to the near side in the rear-upward direction from the front-downward direction as the start point is a natural movement for humans. Since this natural movement is defined as the operation to shift from the あ(*a*)-row to the お 8(*o*)-row, the HMD 100 with more excellent operability is provided.

B. Second Embodiment

In the first embodiment, the row positions on the input board P12 are decided corresponding to the respective angles of rotation θ in the circumferential direction of the wrist. Meanwhile, in a second embodiment, the row positions are decided in a different way, and the rest of the configuration is the same as that of the first embodiment. In the description below, the same components of the configuration are denoted by the same reference signs.

Figure 19:
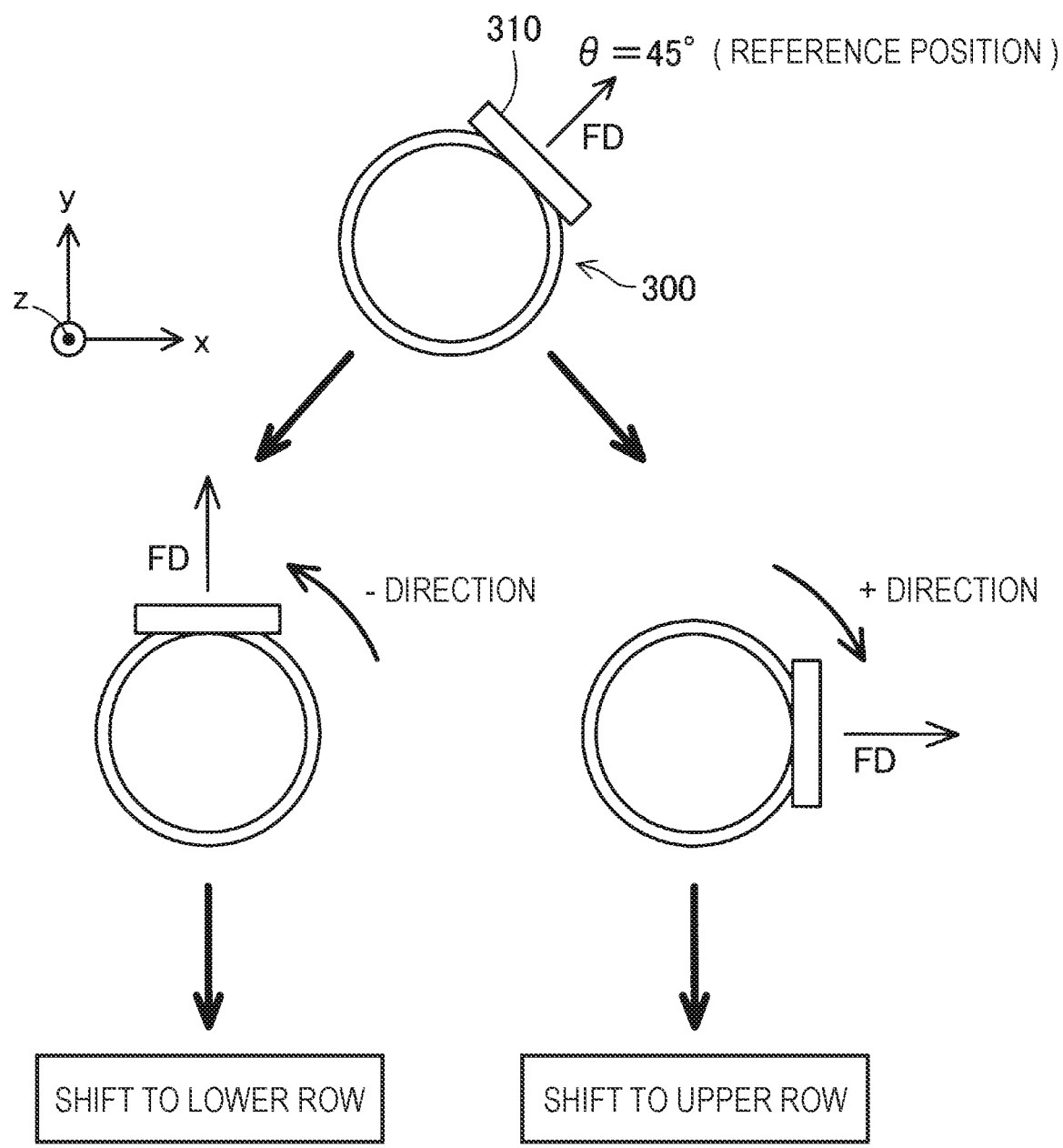
FIG. 19 is an explanatory view showing the way to decide a row position in a second embodiment.

FIG. 19 is an explanatory view showing the way of deciding the row positions in the second embodiment. The position taken when the angle of rotation θ in the circumferential direction of the wrist is, for example, 45 degrees, that is, when the direction FD of the face 310 of the wristwatch-type device 300 is the front-downward direction, is defined as a reference position. The row position is shifted down when the direction FD of the face 310 is rotated in the negative direction (to the near side) from the reference position. The row position is shifted up when the direction FD of the face 310 is rotated in the positive direction (to the far side) from the reference position.

Specifically, if the direction FD of the face 310 is tilted (at any tilt angle) in the negative direction (to the near side) from the reference position and that state is maintained, the row position on the input board P12 sequentially proceeds toward the "お (*o*)-row" as the duration of holding the state becomes longer. That is, the amount of proceeding toward the "お (*o*)-row" increases as the duration of holding the state becomes longer. Subsequently, the increase is stopped by returning the direction FD of the face 310 to the positive direction. If the direction FD of the face 310 is tilted (at any tilt angle) in the positive direction (to the far side) from the reference position and that state is maintained, the row position on the input board P12 sequentially proceeds toward the "あ(*a*)-row" as the duration of holding the state becomes longer. That is, the amount of proceeding toward the "あ(*a*)-row" increases as the duration of holding the state becomes longer. Subsequently, the increase is stopped by returning the direction FD of the face 310 to the negative direction.

With the display system according to the second embodiment configured as described above, the user can input Japanese hiragana characters with high operability, simply by moving the arm with the wristwatch-type device 300 mounted thereon. Also, since the movement in the circumferential direction of the arm can be easily detected, an advanced detection function is not needed for this and the processing load on the HMD 100 can be reduced.

In the second embodiment, the reference position need not be limited to the position such that the angle of rotation θ in the circumferential direction of the wrist is 45 degrees. Instead of this, positions with various angles of rotation θ may be employed, such as a position such that the angle of rotation θ is, for example, 90 degrees, that is, a position such that the direction FD of the face 310 is the front direction. The reference position need not be limited to a position such that the angle of rotation θ has a single value, and may be a position such that the angle of rotation θ has a certain range of values. For example, a position such that the angle of rotation θ is within a range of 35 to 55 degrees may be employed as the reference position. The reference position need not be limited to a preset value or range, either, and may be able to be set freely by the user.

Moreover, if no reference position is provided and the direction FD of the face 310 is tilted (at any tilt angle) in the negative direction (to the near side) from a still state and that state is maintained, the row position on the input board P12 sequentially proceeds toward the "お (*o*)-row" as the duration of holding the state becomes longer. Subsequently, the increase is stopped by returning the direction FD of the face 310 to the positive direction. If the direction FD of the face 310 is tilted (at any tilt angle) in the positive direction (to the far side) from a still state and that state is maintained, the row position on the input board P12 sequentially proceeds toward the "あ(*a*)-row" as the duration of holding the state becomes longer. Subsequently, the increase is stopped by returning the direction FD of the face 310 to the negative direction.

In the second embodiment, a shift to the lower row is made when the direction FD of the face 310 is tilted in the negative direction from the reference position, and a shift to the upper row is made when the direction FD of the face 310 is tilted in the positive direction from the reference position.

However, instead of this, a shift to the upper row may be made when the direction FD of the face 310 is tilted in the negative direction, and a shift to the lower row may be made when the direction FD of the face 310 is tilted in the positive direction.

C. Third Embodiment

In the first and second embodiments, the user carries out an operation on the input board P12 by moving the wrist in the circumferential direction in the state of holding out the forearm in front of the chest. In contrast, in a third embodiment, a configuration in which the user carries out an operation on the input board P12 by moving the wrist in the circumferential direction in the state of holding down the arm may be employed. In this embodiment, the rest of the configuration is the same as in the first embodiment. In the description below, the same components of the configuration are denoted by the same reference signs in the first embodiment.

Figure 20:
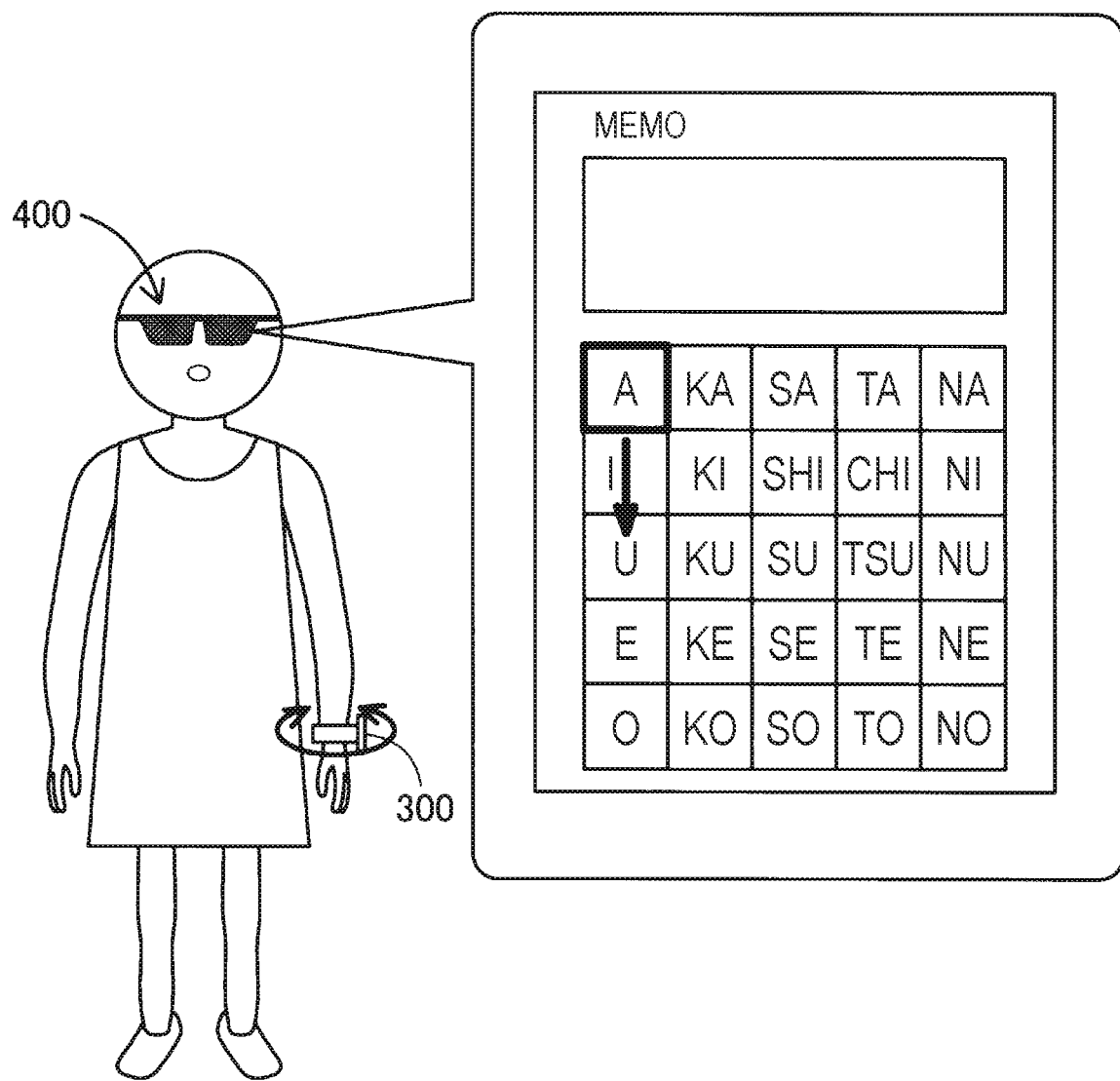
FIG. 20 is an explanatory view showing the way to operate the hiragana input board in the second embodiment.

FIG. 20 is an explanatory view showing the way of operating the input board P12 in the third embodiment. In the third embodiment, based on the detection signal from the 6-axis sensor and a detection signal from the magnetic sensor provided in the wristwatch-type device 300, an HMD 400 detects a movement of moving the wrist in the circumferential direction in the state where the user holds down the arm instead of lifting the arm as in the first embodiment, and the HMD 400 changes the row position of vowel on the input board P12 according to the detected movement.

As the way of changing the row position of vowel, the row position may be decided corresponding to each angle of rotation θ in the circumferential direction of the wrist, as in the first embodiment, or the direction in which the row position is shifted may be decided according to the direction of rotation with respect to a reference position, as in the second embodiment.

With the display system according to the third embodiment configured as described above, the user can input Japanese hiragana characters with high operability, simply by moving the arm with the wristwatch-type device 300 mounted thereon, as with the display systems according to the first and second embodiments. Also, since the movement in the circumferential direction of the arm can be easily detected, an advanced detection function is not needed for this and the processing load on the HMD 400 can be reduced.

D. Fourth Embodiment

In the first to third embodiments and their modifications, the operation screen to be operated is the input board P12 where Japanese hiragana characters are inputted. In contrast, in a fourth embodiment, the operation screen is a scrolling list for ordering a product and the rest of the configuration is the same as in the first embodiment. In the description below, the same components of the configuration are denoted by the same reference signs in the first embodiment.

Figure 21:
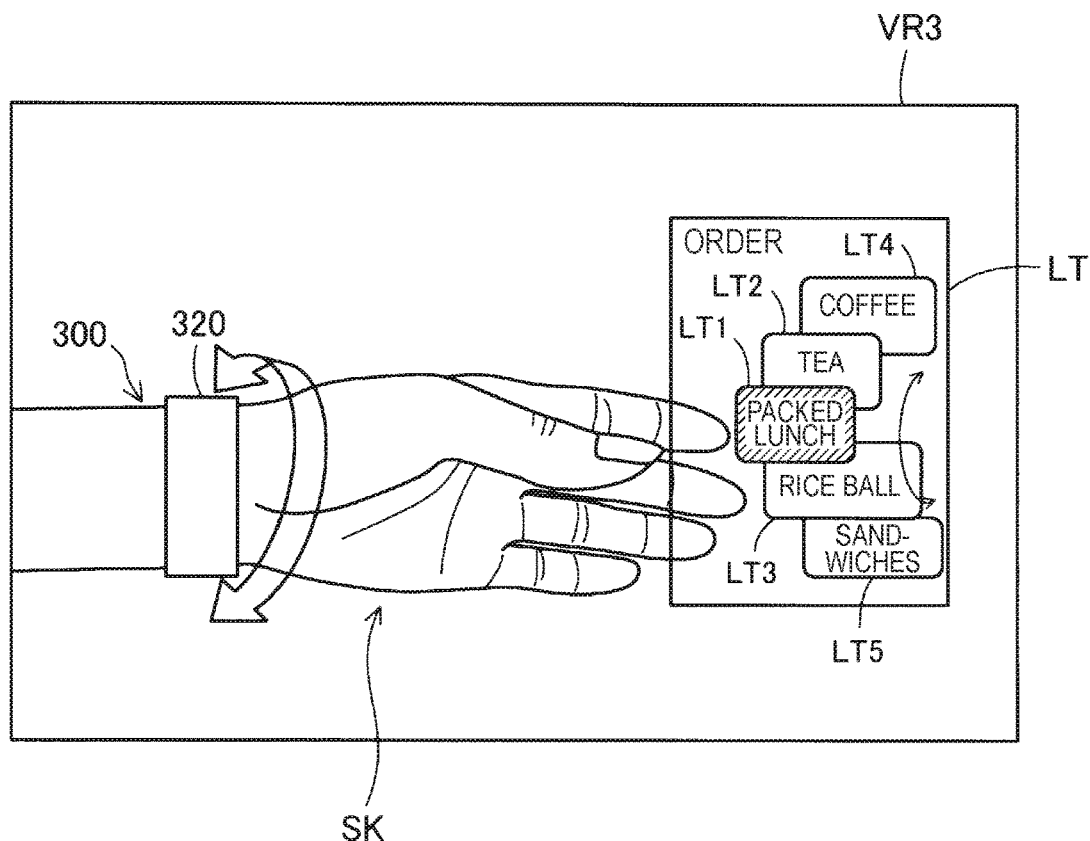
FIG. 21 is an explanatory view showing an example of a scrolling list.

FIG. 21 is an explanatory view showing an example of a scrolling list LT for ordering a product. As illustrated, a field of view VR3 visually recognized by the user includes the external scenery SC transmitted through the light guide plates 26 and 28 of the image display unit 20 (FIG. 1) and the scrolling list LT displayed by the image display unit 20.

In the scrolling list LT, five choice sections, each of which can contain a product choice, are prepared. A first choice section LT1 is arranged at the forefront, and a second choice section LT2 and a third choice section LT3 are arranged in the second row right behind the A first choice section LT1. In the third row behind these, a fourth choice section LT4 and a fifth choice section LT5 are arranged. As illustrated, in the first to fifth choice sections LT1 to LT5, "packed lunch", "tea", "rice ball", "coffee", and "sandwiches" are stored in this order. The illustration shows that the first choice section LT1 at the forefront is selected (hatched in the illustration). While the number of choice sections is five in this embodiment, it need not be limited to five and other plural numbers can be employed.

In this embodiment, the scrolling list LT rotates according to the movement in the circumferential direction of the arm with the wristwatch-type device 300 mounted thereon. Specifically, the direction of rotation of the scrolling list LT is decided according to the direction of rotation with respect to a reference position, as in the second embodiment. As the scrolling list LT rotates, the products stored in the first to fifth choice sections LT1 to LT5 sequentially move. As a result, the product stored in the first choice section LT1 moves and the selected product can be designated.

With the display system according to the fourth embodiment configured as described above, the operation of the scrolling list LT rotating about one axis can be carried out with high operability by moving the arm in the circumferential direction. Also, since the movement in the circumferential direction of the arm can be easily detected, an advanced detection function is not needed for this and the processing load on the HMD can be reduced.

E. Modifications

The invention is not limited to the first to fourth embodiments and their modifications and can be carried out in various other configurations without departing from the scope of the invention. For example, the following modifications are possible.

Modification 1

In the embodiments and modifications, the input board P12 as an operation screen is operated according to the movement in the circumferential direction of the arm on which the wristwatch-type device as an input device is mounted. Meanwhile, as a modification, the input board P12 as an operation screen may be operated according to the movement in the circumferential direction of a leg.

Figure 22:
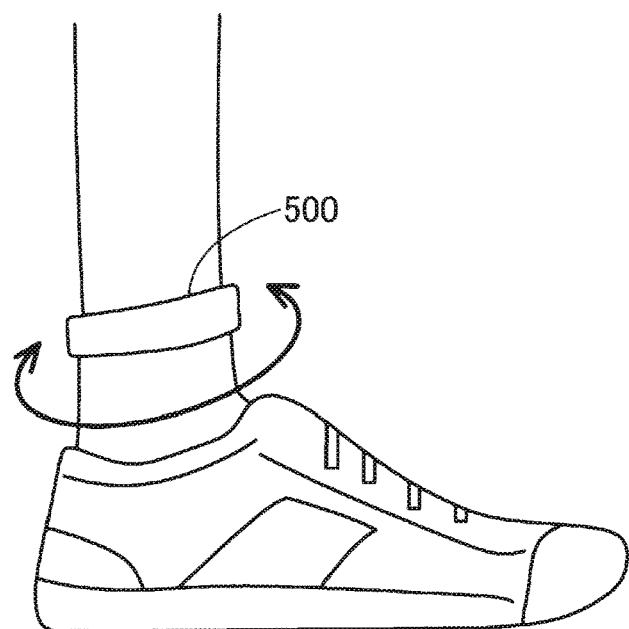
FIG. 22 is an explanatory view showing a strap-like device provided in a display system as a modification.

FIG. 22 is an explanatory view showing a strap-type device as an input device provided in a display system as Modification 1. A strap-type device 500 is mounted near the ankle of a leg of the user wearing the HMD. The strap-type device 500 has a 6-axis sensor and a magnetic sensor and can detect a movement in the circumferential direction of the leg, based on detection signals from these sensors, similarly to the wristwatch-type device used in the first to fourth embodiments. The input board P12 as an operation screen is operated according to the detected movement in the circumferential direction of the leg. Specifically, the row position to switch the vowel is changed on the input board P12 according to the movement in the circumferential direction of the leg. Moreover, a tilt (bending angle) of the distal end-side part (lower leg) from the knee (joint) of the leg may be detected by the 6-axis sensor and the magnetic sensor, and the input board P12 as an operation screen may be operated according to the tilt of the leg in addition to the movement in the circumferential direction of the leg. Specifically, the column position to switch the consonant is changed on the input board P12 according to the tilt of the leg. According to this Modification 1, an operation of the operation screen can be carried out with the leg and excellent operability is provided.

Also, as a configuration combining the first embodiment and Modification 1, the input board P12 as an operation screen may be switched according to both the movement in the circumferential direction of the arm with the wristwatch-type device mounted thereon and the movement in the circumferential direction of the leg. Specifically, for example, the row position may be changed according to the movement in the circumferential direction of the arm, and the column position may be changed according to the movement in the circumferential direction of the leg.

Modification 2

In the embodiments and modifications, the row position is changed on the input board P12 according to the movement in the circumferential direction of the arm, and the column position is changed on the input board P12 according to the gradient of the axial line of the arm. Meanwhile, as a modification, the column position may be changed according to the movement in the circumferential direction of the arm, and the row position may be changed according to the gradient of the axial line of the arm.

Modification 3

In the first and second embodiments, when the user holds out the forearm in front of the chest and turns the direction of the face to the side opposite to him/herself, this is regarded as a trigger to start character input. Meanwhile, as a modification, the trigger may be when a button as a GUI is designated by the control device 10, when an application that needs character input is started, or when the wristwatch-type wearable device 300 is detected by the camera 61, or the like.

Modification 4

In the embodiments and modifications, the movement in the circumferential direction of the arm is detected by the 6-axis sensor and the magnetic sensor. However, it is not always necessary to use the 6-axis sensor and the magnetic sensor. For example, it is possible to use only the 6-axis sensor. Also, while the 6-axis sensor has the 3-axis acceleration sensor and the 3-axis gyro (angular velocity) sensor, the 3-axis acceleration sensor may be used instead of the 6-axis sensor. Moreover, a 2-axis acceleration sensor may be used instead of the 6-axis sensor. An acceleration sensor with two or more axes may suffice. Also, the sensor used is not limited to the acceleration sensor. Any device provided in the input device and configured to be able to directly or indirectly detect the movement in the circumferential direction of the arm can be employed.

Modification 5

In the embodiments and modifications, a knocking action is made as the operation of confirming the selected key that is shifted in position. Meanwhile, as a modification, an action such as largely swinging the arm or tapping with the leg may be employed as the operation of confirming the selected key.

Modification 6

In the embodiments and modifications, the operation screen is a hiragana input board for inputting characters of the Japanese hiragana syllabary. Meanwhile, as a modification, the operation screen may be an alphabetic input board for inputting alphabet letters.

Figure 23:
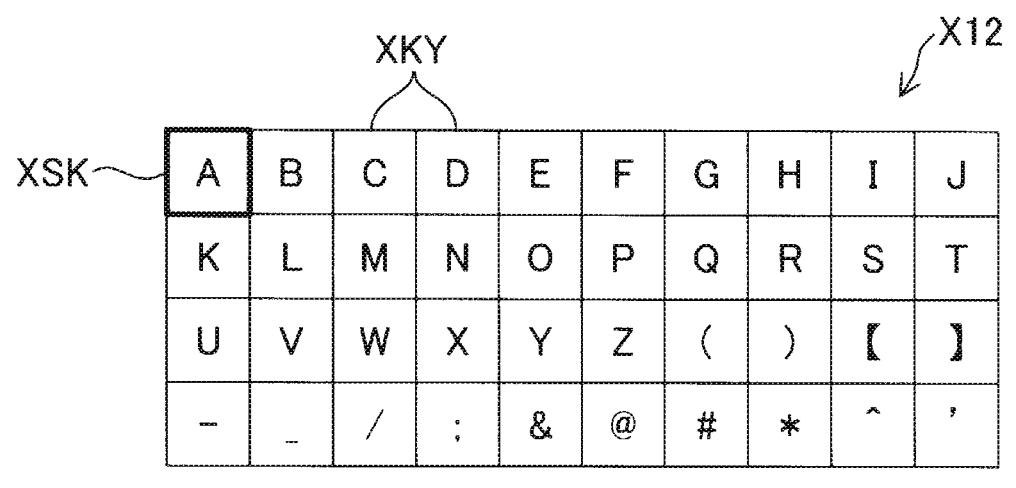

FIG. 23 is an explanatory view showing an alphabetic input board. An alphabetic input board X12 is configured to include four keys arranged in the longitudinal direction by ten keys arranged in the lateral direction, that is, 40 keys XKY in total. In the first row, the alphabet letters "A" to "J" are allocated from left to right. In the second row, the alphabet letters "K" to "T" are allocated from left to right. In the third row, the alphabet letters "U" to "Z" and the symbols "(", ")", "[", and "]" are allocated from left to right. In the fourth row, the symbols "-", "_", "/", ";" and the like are allocated from left to right.

According to Modification 6, in which the alphabetic input board X12 is provided, the user can shift a selected key XSK in the longitudinal direction on the input board X12 by rotating in the circumferential direction the arm with the wristwatch-type device 300 mounted thereon, and the user can shift the selected key XSK in the lateral direction by bending the arm, as in the first embodiment. Thus, the user can input alphabet letters simply by moving the arm with the wristwatch-type device 300 mounted thereon. Therefore, the HMD in this modification provides excellent operability.

Modification 7

In the embodiments and modifications, the input device is a strap-type device mounted on the arm or leg. Meanwhile, as a modification, other forms of wearable devices may be employed. Alternatively, the movement in the circumferential direction of the arm may be detected when the user grips a pen-type device, mobile phone, smartphone or the like, with a hand.

Modification 8

In the embodiments and modifications, the input device is a wristwatch-type wearable device having a time measuring function. Meanwhile, as a modification, a wristband-type wearable device without having a time measuring function may be employed. In this case, since the wristband-type wearable device does not have a face, the user finds it difficult to know which direction the wristband-type wearable device faces. In order to solve this, a part in a specific shape, a light emitting part, or the like may be provided as a mark at a predetermined position on the wristband-type wearable device. Also, the wristband-type wearable device may be configured to display the direction of the wristband-type wearable device or its state of rotation (direction of rotation, being still, or the like) on the image display unit 20. Also, the configuration to display the direction or state of rotation on the image display unit 20 may be added to each embodiment where the wristwatch-type device is employed.

Modification 9

In the first to third embodiments, the operation screen is an input board where keys are arrayed in the longitudinal and lateral directions. In the fourth embodiment, the operation screen is a scrolling list. However, the operation screen is not limited to these. Any configuration in which keys are arrayed at least in one axial direction can be employed.

Modification 10

In the embodiments and modifications, a part of the configurations realized by hardware may be replaced by software. Meanwhile, a part of the configurations realized by software may be replaced by hardware.

Modification 11

In the embodiments, an example of the configuration of the HMD is described. However, the configuration of the HMD can be arbitrarily defined without departing from the scope of the invention. For example, addition, deletion, change or the like of components can be made.

In the embodiments, the so-called transmission-type HMD 100 which transmits external light through the right light guide plate 26 and the left light guide plate 28 is described. However, the invention can also be applied to a non-transmission-type HMD 100 which does not transmit external light but displays an image. In the non-transmission-type HMD 100, an image of the external scenery may be picked up by a camera and the picked-up image may be displayed on a display unit. With these HMDs 100, MR (mixed reality) display in which a picked-up image of the real space and a virtual image are displayed in combination with each other, or VR (virtual reality) display in which a virtual space is displayed can be carried out, in addition to the AR (augmented reality) display in which an image is displayed as superimposed on the real space, as described in the embodiments.

In the embodiments, the functional units of the control device 10 and the image display unit 20 are described. However, these can be arbitrarily changed. For example, the following configurations may be employed. A configuration in which the storage function unit 122 and the control function unit 150 are installed in the control device 10, whereas only the display function is provided in the image display unit 20, may be employed. Also, a configuration in which the storage function unit 122 and the control function unit 150 are installed in both of the control device 10 and the image display unit 20 may be employed. Moreover, a configuration in which the control device 10 and the image display unit 20 are unified may be employed. In this case, for example, the image display unit 20 includes all of the components of the control device 10 and is configured as an eyeglasses-type wearable computer. Also, a configuration in which a smartphone or portable game machine is used instead of the control device 10 may be employed. Moreover, a configuration in which the control device 10 and the image display unit 20 are connected together via wireless communication, thus eliminating the connection cable 40, may be employed. In this case, for example, electricity may be wirelessly fed to the control device 10 and the image display unit 20.

Modification 12

In the embodiments, an example of the configuration of the control device is described. However, the configuration of the control device can be arbitrarily defined without departing from the scope of the invention. For example, addition, deletion, change or the like of components can be made.

In the embodiments, an example of the input measure provided in the control device 10 is described. However, in the control device 10, a part of the input measures described above may be omitted, or other input measures, not described above, may be provided. For example, the control device 10 may have an operation stick, a keyboard, a mouse or the like. For example, the control device 10 may have an input measure for interpreting a command corresponding to a movement or the like of the body of the user. The movement or the like of the body of the user can be acquired, for example, by line-of-sight detection in which the line of sight is detected, gesture detection in which a movement of a hand is detected, a foot switch which detects a movement of a foot, or the like. The line-of-sight detection can be realized, for example, by a camera which picks up an image inside the image display unit 20. The gesture detection can be realized, for example, by analyzing images picked up by the camera 61 with the lapse of time.

In the embodiments, the control function unit 150 operates as the main processor 140 executes a computer program stored in the storage function unit 122. However, the control function unit 150 may employ various configurations. For example, the computer program may be stored in the non-volatile storage unit 121, the EEPROM 215, the memory 118, and other external storage devices (including a storage device such as a USB memory inserted in various interfaces, and an external device such as a server connected via a network), instead of the storage function unit 122 or along with the storage function unit 122. Each function of the control function unit 150 may be realized using an ASIC (application specific integrated circuit) designed to realize the function.

Modification 13

In the embodiments, an example of the configuration of the image display unit is described. However, the configuration of the image display unit may be arbitrarily defined without departing from the scope of the invention. For example, addition, deletion, change or the like of components can be made.

Figure 24:
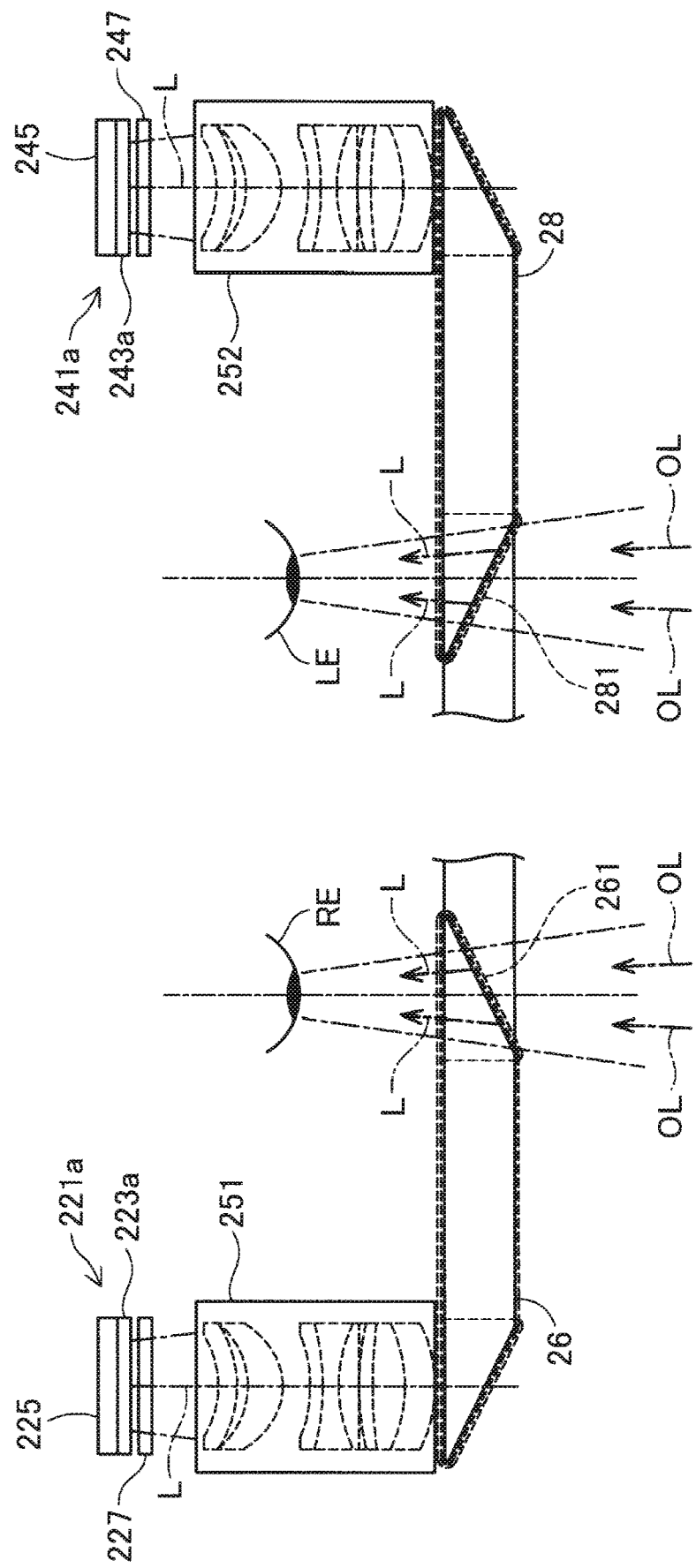
FIG. 24 is a plan view of essential parts showing the configuration of an optical system provided in an image display unit according to a modification.

FIG. 24 is a plan view of essential parts showing the configuration of an optical system provided in an image display unit according to a modification. In the image display unit according to the modification, an OLED unit 221*a* corresponding to the right eye RE of the user and an OLED unit 241*a* corresponding to the left eye LE are provided. The OLED unit 221*a* corresponding to the right eye RE has an OLED panel 223*a* which emits white light, and an OLED drive circuit 225 which drives the OLED panel 223*a* and thus causes the OLED panel 223*a* to emit light. A modulation element 227 (modulation device) is arranged between the OLED panel 223*a* and the right optical system 251. The modulation element 227 is configured of, for example, a transmission-type liquid crystal panel. The modulation element 227 modulates the light emitted by the OLED panel 223*a* and generates image light L. The image light L transmitted and modulated through the modulation element 227 is guided to the right eye RE by the right light guide plate 26.

The OLED unit 241*a* corresponding to the left eye LE has an OLED panel 243*a* which emits white light, and an OLED drive circuit 245 which drives the OLED panel 243*a* and thus causes the OLED panel 243*a* to emit light. A modulation element 247 (modulation device) is arranged between the OLED panel 243*a* and the right optical system 252. The modulation element 247 is configured of, for example, a transmission-type liquid crystal panel. The modulation element 247 modulates the light emitted by the OLED panel 243*a* and generates image light L. The image light L transmitted and modulated through the modulation element 247 is guided to the left eye LE by the left light guide plate 28. The modulation elements 227, 247 are connected to a liquid crystal driver circuit, not illustrated. This liquid crystal driver circuit (modulation device drive unit) is mounted, for example, on a substrate arranged near the modulation elements 227, 247.

In the image display unit according to the modification, each of the right display unit 22 and the left display unit 24 is configured as a video element having the OLED panels 223*a*, 243*a* as a light source unit, and the modulation elements 227, 247, which modulate light emitted from the light source unit and output image light including a plurality of color lights. The modulation devices for modulating the light emitted from the OLED panels 223*a*, 243*a* are not limited to the configuration which employs a transmission-type liquid crystal panel. For example, instead of the transmission-type liquid crystal panel, a reflection-type liquid crystal panel may be used, or a digital micromirror device may be used. Also, a retinal laser projection-type HMD 100 may be employed.

In the embodiments, the eyeglasses-type image display unit 20 is described. However, the configuration of the image display unit 20 can be arbitrarily changed. For example, the image display unit 20 may be configured to be worn like a hat, or may be built in body protection equipment such as a helmet. Also, the image display unit 20 may be configured as an HUD (head-up display) installed in vehicles such as automobile or aircraft, or other transport measures.

In the embodiments, the configuration in which a virtual image is formed by the half mirrors 261, 281 at a part of the right light guide plate 26 and the left light guide plate 28 is described as an example of the optical system which guides image light to the eyes of the user. However, this configuration can be arbitrarily changed. For example, a virtual image may be formed in an area covering the entire surface (or a major part) of the right light guide plate 26 and the left light guide plate 28. In this case, the image may be reduced by an operation of changing the display position of the image. Also, the optical elements in the invention are not limited to the right light guide plate 26 having the half mirror 261 and the left light guide plate 28 having the half mirror 281. An arbitrary configuration using an optical component (for example, diffraction grating, prism, holography or the like) which causes image light to become incident on the eyes of the user can be employed.

The invention is not limited to the foregoing embodiments, examples, and modifications, and can be realized with various configurations without departing from the scope of the invention. For example, technical features of the embodiments, examples, and modifications corresponding to technical features of the respective configurations described in the summary section can be replaced or combined where appropriate, in order to solve a part or all of the foregoing problems or in order to achieve a part or all of the foregoing advantageous effects. These technical features can be deleted where appropriate, unless described as essential in this specification.

The entire disclosure of Japanese Patent Application No. 2017-014483, filed Jan. 30, 2017 is expressly incorporated by reference herein.

What is claimed is:

1. A display system comprising a head-mounted display device and an input device for operating the head-mounted display device, wherein
   the input device is mounted on an arm or a leg of a user and has a movement detection unit comprising a sensor which detects a movement in a circumferential direction that is circumferential around the periphery of the arm or the leg where the input device is mounted, and
   the head-mounted display device
   displays an operation screen where an operation is accepted, and
   switches the operation on the operation screen according to the movement detected by the movement detection unit, the switching of the operation on the operation screen comprising: determining a relative movement in a circumferential direction that is circumferential around the periphery of the arm or the leg with respect to a direction of the image display unit, based on comparing the movement detected by the movement detection unit relative to the movement of the image display unit detected by the display unit movement detection unit.

2. The display system according to claim 1, wherein
the head-mounted display device has a display unit movement detection unit comprising a sensor which detects a movement of an image display unit provided in the head-mounted display device,
the switching of the operation on the operation screen further comprises:
   switching the operation on the operation screen according to the relative movement thus found.

3. The display system according to claim 2, wherein
the input device is a wristband-type wearable device.

4. The display system according to claim 1, wherein
the movement detection unit has
an acceleration sensor with two or more axes, and
a processor which detects the movement from a detection signal of the acceleration sensor.

5. The display system according to claim 1, wherein
the operation screen is an input board where five characters of the Japanese kana characters are arrayed in one of longitudinal and lateral directions, based on vowels, and ten characters are arrayed in the other of the longitudinal and lateral directions, based on consonants, and
the switching of the operation according to the movement is switching a character selected from among the characters arrayed in the one of the longitudinal and lateral directions on the input board.

6. The display system according to claim 5, wherein
the input device has a second movement detection unit which detects a movement in a bending direction of a distal end-side part from a joint of the arm or the leg where the input device is mounted, and
the head-mounted display device may switch a character selected from among the characters arrayed in the other of the longitudinal and lateral directions on the input board according to the movement detected by the second movement detection unit.

7. The display system according to claim 1, wherein,
the input device is a wristband-type wearable device,
the operation screen is an input board where five characters of the Japanese kana characters are arrayed in one of longitudinal and lateral directions, based on vowels, and where ten characters are arrayed in the other of the longitudinal and lateral directions, based on consonants,
the switching of the operation according to the movement is switching vowels on the input board, and
the movement detection unit is configured to detect a movement of holding out the forearm in front of the chest and then rotating the wrist.

* * * * *